(12) United States Patent
Roundtree

(10) Patent No.: US 9,348,979 B2
(45) Date of Patent: May 24, 2016

(54) PRIVACY SENSITIVE PERSONA MANAGEMENT TOOLS

(71) Applicant: Nfluence Media, Inc., Seattle, WA (US)

(72) Inventor: Brian Roundtree, Seattle, WA (US)

(73) Assignee: AutoGraph, Inc., Seattle, WA (US)

( * ) Notice: Subject to any disclaimer, the term of this patent is extended or adjusted under 35 U.S.C. 154(b) by 0 days.

(21) Appl. No.: 14/280,480

(22) Filed: May 16, 2014

(65) Prior Publication Data

US 2014/0344953 A1 Nov. 20, 2014

Related U.S. Application Data

(60) Provisional application No. 61/824,353, filed on May 16, 2013.

(51) Int. Cl.
*G06F 17/30* (2006.01)
*G06F 21/10* (2013.01)
*G06Q 30/02* (2012.01)
*G06F 21/60* (2013.01)
*G06F 21/62* (2013.01)

(52) U.S. Cl.
CPC .............. *G06F 21/10* (2013.01); *G06F 21/604* (2013.01); *G06F 21/6218* (2013.01); *G06F 21/6263* (2013.01); *G06Q 30/0242* (2013.01); *G06F 2221/2117* (2013.01); *G06F 2221/2141* (2013.01); *G06F 2221/2149* (2013.01)

(58) Field of Classification Search
CPC ..... G06F 21/10; G06F 21/31; G06F 21/6218; G06F 2221/2141; H04L 63/102
USPC ......................................................... 726/28
See application file for complete search history.

(56) References Cited

U.S. PATENT DOCUMENTS

| | | |
|---|---|---|
| 5,991,735 A | 11/1999 | Gerace |
| 6,611,842 B1 | 8/2003 | Brown |
| 7,503,045 B1 * | 3/2009 | Aziz et al. ..................... 718/104 |
| 7,809,740 B2 | 10/2010 | Chung et al. |
| 8,108,245 B1 | 1/2012 | Hosea et al. |
| 8,271,894 B1 | 9/2012 | Mayers |
| 8,306,977 B1 | 11/2012 | Gildfind |
| 8,429,527 B1 * | 4/2013 | Arbogast ..................... 715/255 |
| 8,620,748 B1 | 12/2013 | Ruarte et al. |
| 2003/0055722 A1 | 3/2003 | Perreault et al. |
| 2003/0061607 A1 | 3/2003 | Hunter et al. |

(Continued)

FOREIGN PATENT DOCUMENTS

| | | |
|---|---|---|
| EP | 2226719 | 9/2010 |
| WO | WO-2010018451 | 2/2010 |

OTHER PUBLICATIONS

International Search Report and Written Opinion for PCT/US2012/41178, Applicant: Nfluence Media, Inc., Mailed Aug. 17, 2012, 6 pages.

(Continued)

*Primary Examiner* — Baotran N To
(74) *Attorney, Agent, or Firm* — Perkins Coie LLP

(57) ABSTRACT

The disclosed tools include enhanced and flexible tools to enable users who may be business competitors to share non-generic data in a substantially generic and in a substantially equitable manner. The resulting incentive to more freely share data between competitors will benefit users such as brand owners and enhance content delivered to their end users based on shared data.

16 Claims, 18 Drawing Sheets

(56) References Cited

U.S. PATENT DOCUMENTS

| | | |
|---|---|---|
| 2003/0131260 A1 | 7/2003 | Hanson et al. |
| 2003/0144035 A1 | 7/2003 | Weinblatt et al. |
| 2004/0088513 A1* | 5/2004 | Biessener et al. ............ 711/173 |
| 2004/0215692 A1 | 10/2004 | Vasudevan et al. |
| 2005/0044569 A1 | 2/2005 | Marcus |
| 2005/0283796 A1 | 12/2005 | Flickinger |
| 2006/0010400 A1 | 1/2006 | Dehlin et al. |
| 2006/0259360 A1 | 11/2006 | Flinn et al. |
| 2007/0067331 A1 | 3/2007 | Schachter et al. |
| 2007/0094083 A1 | 4/2007 | Yruski et al. |
| 2007/0244872 A1 | 10/2007 | Hancock |
| 2007/0257792 A1 | 11/2007 | Gold |
| 2007/0260624 A1 | 11/2007 | Chung et al. |
| 2007/0294091 A1 | 12/2007 | Cohen et al. |
| 2008/0035734 A1 | 2/2008 | Challa et al. |
| 2008/0097867 A1 | 4/2008 | Engle |
| 2008/0126175 A1 | 5/2008 | Alexander |
| 2008/0201734 A1 | 8/2008 | Lyon et al. |
| 2008/0235085 A1 | 9/2008 | Kovinsky et al. |
| 2008/0262908 A1 | 10/2008 | Broady et al. |
| 2008/0270398 A1 | 10/2008 | Landau et al. |
| 2008/0288331 A1 | 11/2008 | Magids et al. |
| 2008/0319862 A1 | 12/2008 | Golan et al. |
| 2009/0006214 A1 | 1/2009 | Lerman et al. |
| 2009/0013268 A1 | 1/2009 | Amit |
| 2009/0018915 A1 | 1/2009 | Fisse |
| 2009/0063551 A1 | 3/2009 | Shuster |
| 2009/0089310 A1 | 4/2009 | Lara et al. |
| 2009/0099932 A1 | 4/2009 | Ahopelto |
| 2009/0106113 A1 | 4/2009 | Arora et al. |
| 2009/0112714 A1 | 4/2009 | Steelberg et al. |
| 2009/0132943 A1 | 5/2009 | Minsky et al. |
| 2009/0234691 A1 | 9/2009 | Steelberg et al. |
| 2009/0271256 A1 | 10/2009 | Toebes et al. |
| 2010/0057743 A1 | 3/2010 | Pierce |
| 2010/0063872 A1 | 3/2010 | Patel et al. |
| 2010/0094878 A1 | 4/2010 | Soroca et al. |
| 2010/0161424 A1 | 6/2010 | Sylvain |
| 2010/0169313 A1 | 7/2010 | Kenedy et al. |
| 2010/0185732 A1* | 7/2010 | Hyman ........................ 709/204 |
| 2010/0262497 A1 | 10/2010 | Karlsson |
| 2010/0293036 A1 | 11/2010 | Meyer et al. |
| 2010/0293569 A1 | 11/2010 | Kusumoto et al. |
| 2010/0306702 A1 | 12/2010 | Warner |
| 2010/0318405 A1 | 12/2010 | Kirkby |
| 2010/0331016 A1 | 12/2010 | Dutton et al. |
| 2011/0024490 A1 | 2/2011 | Kangas et al. |
| 2011/0035263 A1 | 2/2011 | Ramanathan |
| 2011/0055017 A1 | 3/2011 | Solomon et al. |
| 2011/0099064 A1 | 4/2011 | Lyon et al. |
| 2011/0126122 A1 | 5/2011 | Forman et al. |
| 2011/0145039 A1 | 6/2011 | McCarney et al. |
| 2011/0153429 A1 | 6/2011 | Ullah |
| 2011/0161331 A1 | 6/2011 | Chung et al. |
| 2011/0215162 A1 | 9/2011 | Challa et al. |
| 2011/0219448 A1 | 9/2011 | Sreedharan et al. |
| 2011/0288913 A1 | 11/2011 | Waylonis et al. |
| 2011/0295664 A1 | 12/2011 | Flinn et al. |
| 2011/0295665 A1 | 12/2011 | Flinn et al. |
| 2011/0295696 A1 | 12/2011 | Flinn et al. |
| 2011/0295699 A1 | 12/2011 | Flinn et al. |
| 2011/0295703 A1 | 12/2011 | Flinn et al. |
| 2011/0319059 A1 | 12/2011 | Padeh |
| 2012/0029986 A1 | 2/2012 | Jalili |
| 2012/0038665 A1 | 2/2012 | Strietzel |
| 2012/0130822 A1 | 5/2012 | Patwa et al. |
| 2012/0166433 A1 | 6/2012 | Tseng |
| 2012/0323704 A1 | 12/2012 | Steelberg et al. |
| 2013/0018698 A1 | 1/2013 | Parnaby et al. |
| 2013/0018838 A1 | 1/2013 | Parnaby et al. |
| 2013/0018957 A1 | 1/2013 | Parnaby et al. |
| 2013/0054366 A1* | 2/2013 | Roundtree et al. ......... 705/14.55 |
| 2013/0075464 A1 | 3/2013 | Van Horn et al. |
| 2013/0085847 A1 | 4/2013 | Dyor et al. |
| 2013/0085848 A1 | 4/2013 | Dyor et al. |
| 2013/0085849 A1 | 4/2013 | Dyor et al. |
| 2013/0085855 A1 | 4/2013 | Dyor et al. |
| 2013/0086499 A1 | 4/2013 | Dyor et al. |
| 2013/0117375 A1 | 5/2013 | Bist et al. |
| 2013/0124628 A1 | 5/2013 | Weerasinghe |
| 2013/0132197 A1 | 5/2013 | Toebes et al. |
| 2013/0144710 A1 | 6/2013 | Roundtree et al. |
| 2013/0144711 A1 | 6/2013 | Roundtree et al. |
| 2013/0151339 A1 | 6/2013 | Kim et al. |
| 2013/0161381 A1 | 6/2013 | Roundtree et al. |
| 2013/0167085 A1 | 6/2013 | Roundtree et al. |
| 2013/0191205 A1 | 7/2013 | Harkless, II et al. |
| 2013/0268357 A1 | 10/2013 | Heath |
| 2013/0291123 A1 | 10/2013 | Rajkumar et al. |
| 2013/0326357 A1 | 12/2013 | O'Donnell et al. |
| 2014/0052527 A1 | 2/2014 | Roundtree |
| 2014/0067542 A1 | 3/2014 | Everingham |
| 2014/0079225 A1 | 3/2014 | Jarske et al. |
| 2014/0108142 A1 | 4/2014 | Toebes et al. |
| 2014/0129344 A1 | 5/2014 | Smith et al. |
| 2014/0136606 A1 | 5/2014 | Roundtree |
| 2014/0278992 A1 | 9/2014 | Roundtree et al. |

OTHER PUBLICATIONS

International Search Report and Written Opinion for PCT/US2012/68319, Applicant: Nfluence Media, Inc., Mailed Apr. 5, 2013, 21 pages.

International Search Report and Written Opinion for PCT/US2013/32643, Applicant: Nfluence Media, Inc., Mailed Jun. 7, 2013, 10 pages.

International Search Report and Written Opinion for PCT/US2013/69766, Applicant: Nfluence Media, Inc., mailed May 13, 2014, 8 pages.

European Patent Office, Extended European Search Report, EP Patent Application 12797069.7, mailed Oct. 2, 2014, 7 pages.

International Searching Authority, International Search Report and Written Opinion, PCT Application PCT/US2014/038502, mailed Oct. 7, 2014, 8 pages.

\* cited by examiner

Fig. 8

Intentionally Left Blank

PRIVACY SENSITIVE PERSONA MANAGEMENT TOOLS

This application claims the benefit of and priority to: U.S. Provisional Patent Application No. 61/824,353 filed May 16, 2013, which is herein incorporated by reference in its entirety.

Related Applications: The following previously filed applications are herein incorporated by reference in their entirety:

U.S. Provisional Patent Application No. 61/493,965;
U.S. Provisional Patent Application No. 61/533,049;
U.S. Provisional Patent Application No. 61/506,601;
U.S. Provisional Patent Application No. 61/567,594;
U.S. Provisional Patent Application No. 61/597,136;
U.S. Provisional Patent Application No. 61/603,216;
U.S. Provisional Patent Application No. 61/683,678;
U.S. Provisional Patent Application No. 61/724,863;
CONSUMER DRIVEN ADVERTISING SYSTEM, U.S. patent application Ser. No. 13/490,444 filed Jun. 6, 2012;
SYSTEM AND METHOD FOR DELIVERING ADS TO PERSONAS BASED ON DETERMINED USER CHARACTERISTICS, U.S. patent application Ser. No. 13/490,449 filed Jun. 6, 2012;
METHOD AND APPARATUS FOR DISPLAYING ADS DIRECTED TO PERSONAS HAVING ASSOCIATED CHARACTERISTICS, U.S. patent application Ser. No. 13/490,447 filed Jun. 6, 2012;
CONSUMER DRIVEN ADVERTISING SYSTEM, International Patent Application No. PCT/US12/41178 filed Jun. 6, 2012;
CONSUMER SELF-PROFILING GUI, ANALYSIS AND RAPID INFORMATION PRESENTATION TOOLS, U.S. application Ser. No. 13/707,581 filed Dec. 6, 2012;
CONSUMER SELF-PROFILING GUI, ANALYSIS AND RAPID INFORMATION PRESENTATION TOOLS, U.S. application Ser. No. 13/707,578 filed Dec. 6, 2012;
CONSUMER SELF-PROFILING GUI, ANALYSIS AND RAPID INFORMATION PRESENTATION TOOLS, PCT Application No. PCT/US12/68319 filed Dec. 6, 2012;
AD BLOCKING TOOLS FOR INTEREST-GRAPH DRIVEN PERSONALIZATION, U.S. patent application Ser. No. 13/843,635 filed Mar. 15, 2013;
REVERSE BRAND SORTING TOOLS FOR INTEREST-GRAPH DRIVEN PERSONALIZATION, U.S. patent application Ser. No. 13/843,270 filed Mar. 15, 2013;
TOOLS FOR INTEREST GRAPH-DRIVEN PERSONALIZATION, PCT Patent Application No. PCT/US13/32643 filed Mar. 15, 2013.

The technology described in these applications as well as the current application are interoperable.

APPENDICES

Appendix A has a summary description of the technologies described in the incorporated applications.

BACKGROUND

Currently, consumer users of email, e-commerce sites and databases as well as brand owners lack tools to efficiently and conveniently manage their account information. Specifically, these users lack ability to easily, equitably and anonymously/ generically share their information and access each other's anonymous/generic information. Sharing data across these users may help all of the users supplement their own proprietary (non-generic) information in order to facilitate better delivery of meaningful and personalized content and for other various marketing and advertising uses.

What is needed are enhanced and flexible tools to enable users such as the above to share non-proprietary data in a substantially fair manner.

BRIEF DESCRIPTION OF THE DRAWINGS

FIG. 8 is intentionally left blank;

DETAILED DESCRIPTION

Profiles and Interest Graphs Primer

Figure 1:
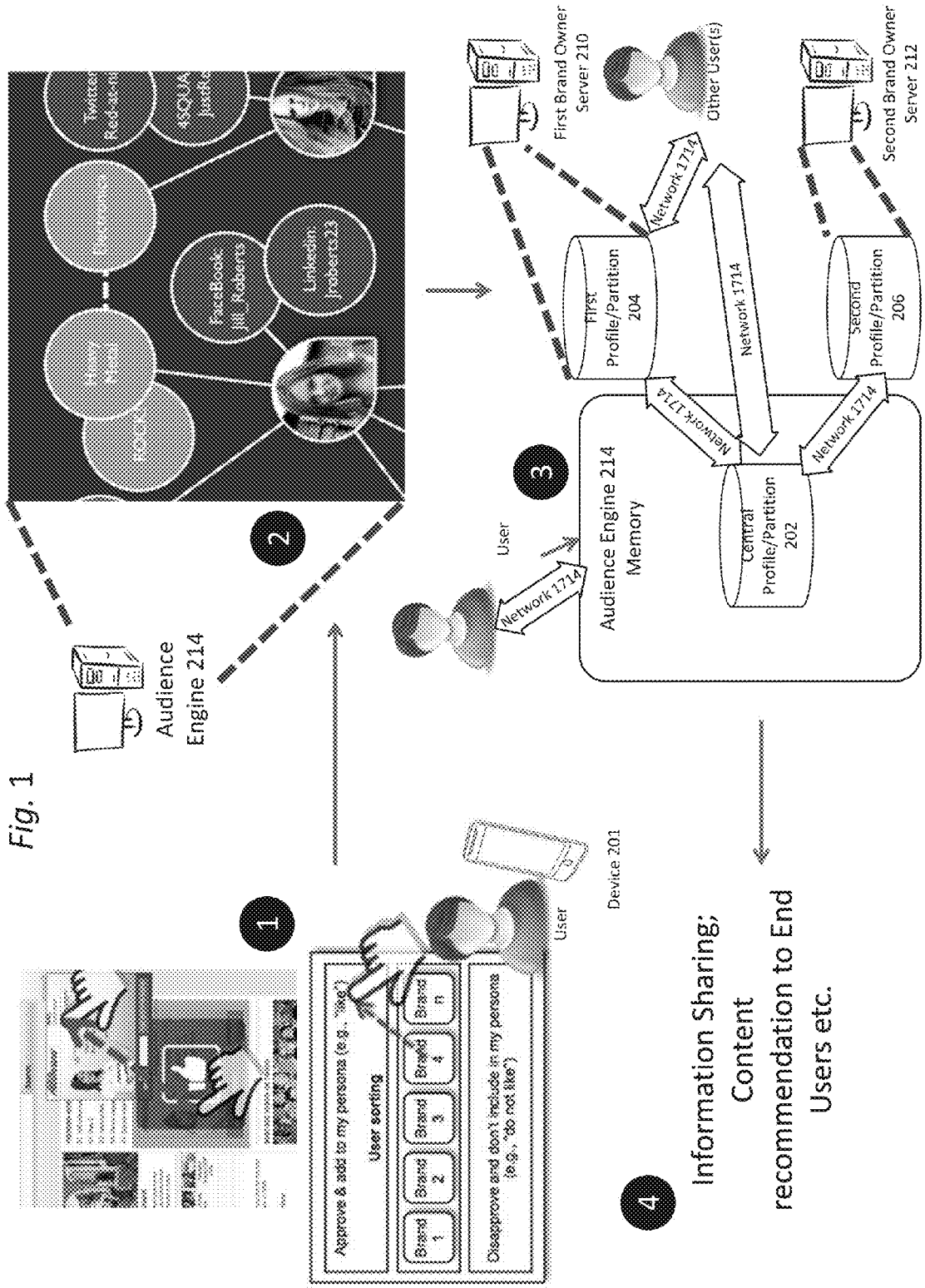
FIG. 1 illustrates an exemplary embodiment comprising: consumer end user data input, database/interest graph creation, audience engine and brand owner data communication/ sharing and finally uses of the aforementioned shared data.
Figure 7:
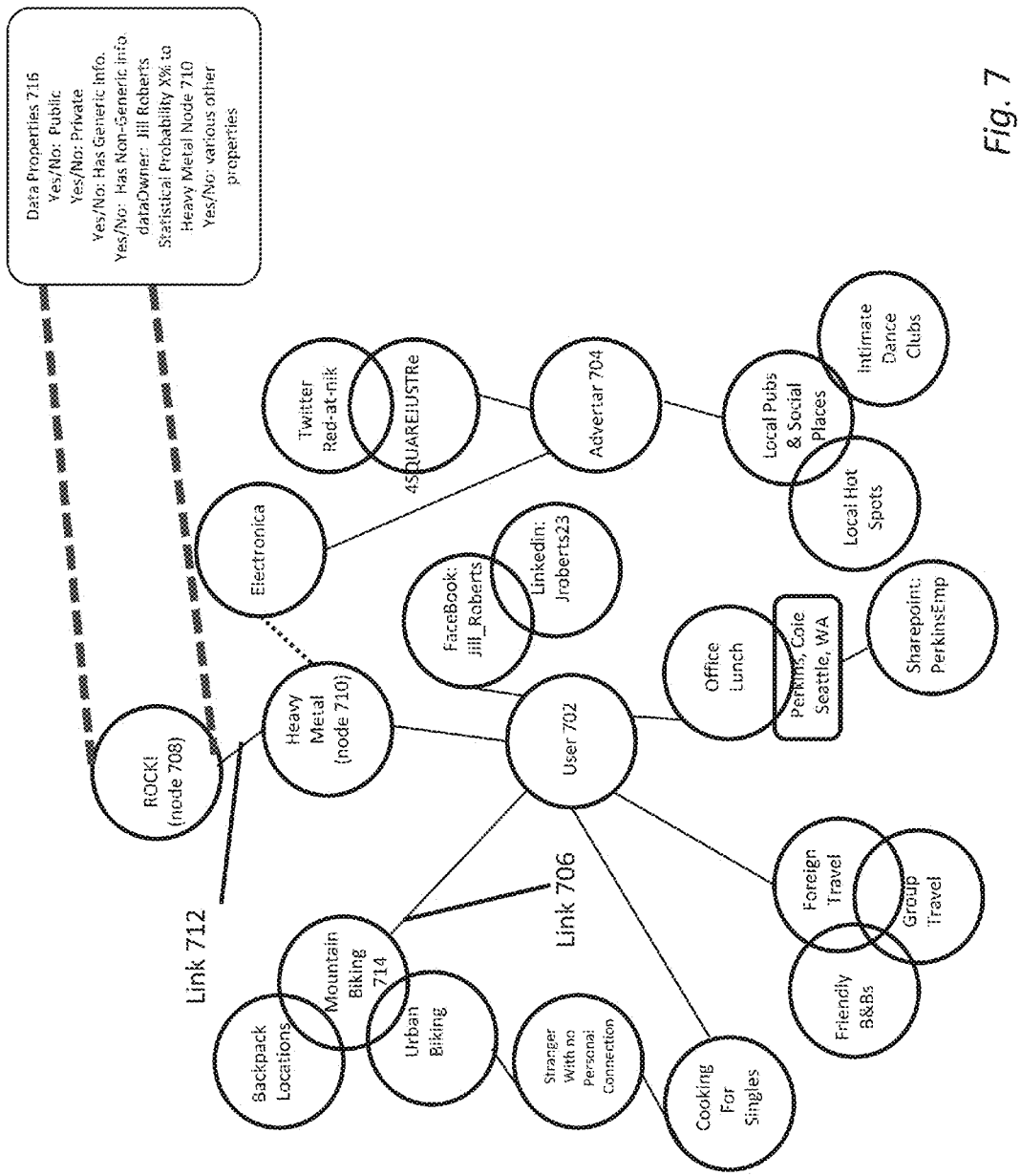
FIG. 7 illustrates an exemplary interest graph.

As discussed in previous patent applications, advertars, personas and profiles of a user may reflect demographics/ characteristics and associated probabilities of a user actually having said demographics/characteristics among other information. Interest graphs provide a valuable tool to represent this information in a computing device. As the user sorts brands and inputs Swote™ input, provides other information regarding their likes or dislikes, or other information, profile data that is reflected in a representation via interest graphs may be created or supplemented as illustrated in FIG. 1. FIG. 7 illustrates one embodiment of an interest graph. In this embodiment of an interest graph, there are nodes 708 that represent a particular interest or other data and links that extend between various interest graph nodes that represent propensities of the interests.

As opposed to a social graph (which may also be included or may contribute to a profile) an interest graph focuses on shared interests regardless of personal connections while a social graph focuses on connections based on personal connections. (In some embodiments, profiles may incorporate social graphs as well or just social graphs alone).

In one embodiment, the nodes of an interest graph refer to the specific and varied interests that form one's personal identity, and the links representing statistical probabilities attempt to connect people based on those interests. Individually, this may mean different things one person is interested in—be it jogging, celebrity gossip, or animal rights—that make up likes and dislikes, and what has more meaning to them over someone else. On a broader scale, the interest graph represents the way those interests form unspoken relationships with others who share them, and expand to create a network of like-minded people.

While the social graph consists of who a user knows, the interest graph consists of what they like, what moves them, and the facets of their personality that, in part, make up who they are. These interests can be represented in an interest graph by an interest graph node 708 and the probabilities, which may be propensities for the user toward each interest as well as propensities between interests themselves. These propensities may be represented as link 706 may also be incorporated into interest graphs. These connections can be much stronger, and much more telling, than simply who they are friends or acquaintances with. For example, two people being linked together because they knew each other in elementary school or work at the same job doesn't necessarily indicate anything about them beyond their connection to each other. And for the people involved, it doesn't always foster a very strong or lasting connection. As such, an interest graph may offer more insight into each person's personal tastes, preferences and behaviors. To further on FIG. 7, link 706 links the mountain biking node 714 to the user node 702. The link may represent a propensity like 72% (any scale or system can be used). Here, the 72% may indicate that there is a 72% chance the user 702 is interested in mountain biking. Expanding further in FIG. 7, link 712 links the heavy metal node 710 to the "ROCK!" node 708. Link 712 may represent a propensity such as +40%. Here, +40% may indicate that if the user 702 is interested in heavy metal, there is a +40% chance the user may be interested in "ROCK!" e.g., if interest in heavy metal then there is a −40% propensity to be interested in ROCK!. In another embodiment the probability may be a negative one such as −40%. This may indicate a level of "disinterest" user 702 has for "ROCK!", For ease of illustration, nodes that overlap in this figure may also be interpreted as being linked.

Thus, given two connected users (such as user 702) connected in an interest graph, the users likely are more interested in the same advertising as opposed to users who are not. In addition, characteristics and associated characteristics (e.g., via a taxonomy) of those users can be studied and offers, products and other goods/services can be developed specifically for those demographics. This provides a highly personalized experience and also connects a user to users who have characteristics in common. As illustrated, not only different users, but also a user's advertar such as 704 may be incorporated into interest graphs.

The data used to create the Interest graphs may itself contain or be associated to properties of the data. For example, in FIG. 7, "ROCK!" node 708 (optionally its probability links as well) may be tagged or otherwise associated with data properties 716. Various properties can be stored such as if the data is public, private, has generic information, has non-generic information, the node owner (here is Jill Roberts—the user of this interest graph), statistical probabilities to connected nodes, products it is related to e.g., rock music songs and various other properties. Properties can be assigned to any data including a link such as link 706.

Thus, interest graphs serve as a useful tool to represent persona information. In addition to nodes and links, other tools such as tables may be used to represent interest graphs and the data the interest graphs are based upon. The tools discussed herein may use interest graphs or other tools to represent and manipulate any profile data. The profile herein may be stored in any number of ways such as a database, array, spreadsheet etc.

Central Partition Introduction

One advantage to aggregation of brand information in a central partition is enhanced analytics. As illustrated in operation 3 in FIG. 1, in one embodiment, central partition 202 may contain an interest graph, whose data was aggregated from data obtained from a variety of sources including various brand owners' servers as well as from direct end user input. Specifically, since this aggregated information was collected from different brand owners, it likely has substantial consumer information that often cannot be collected from a single brand alone. Integration of data from multiple brands into a central interest graph offers many possibilities in enhanced prediction of relevant content such as expanding brand and central partitions accuracy via enhanced marketing data/taxonomies/brand sorting/reverse brand sorting. This information about a user may be shared by the user or auctioned by the user or a third party (e.g., the audience server owner) across brands.

Here, a central partition may be comprised of demographic data, characteristic/interest data, various data from user inputs, brand data, social graphs, contact information, friends, content such as pictures, posts by the user/friends, spend graphs, preferences, location, purchase history, browsing history (e.g., Personally Identifiable Information such as contact information) or any other types of data. As used herein, a partition may be any data in logical memory. Examples may be any data grouping such data randomly dispersed in a dataset across different physical partitions.

As discussed herein, a balance must be found between data sharing and proprietary data confidentiality. In one embodiment as discussed below, any piece of data in the central partition and brand partitions/profiles (e.g., interests graphs) may be tagged with permissions/attribution and statistical probability contributions and then stored on various devices configured for sharing with other partitions as in FIG. 7. This allows various levels of data sharing via permissions/attribution and thus prevents co-mingling of data. In one embodiment, data may be stored in different partitions in which each partition is assigned desired permissions/attribution, which in turn regulates transmission/disclosure to others.

Exemplary Central Partition Creation and Use

Figure 10:
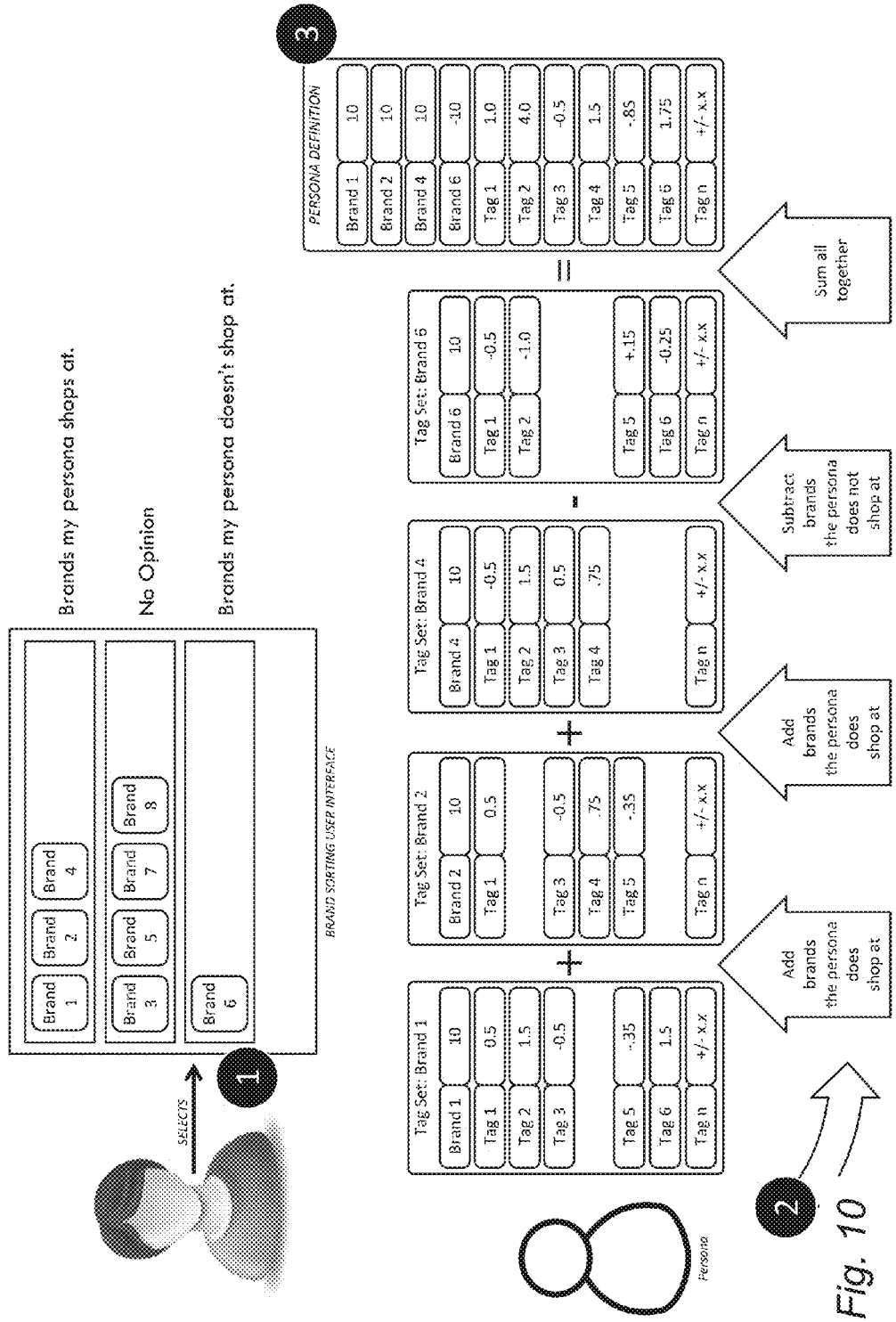
FIG. 10 illustrates one method by which likely demographic characteristics for a persona can be determined based on brand sorting by a user in accordance with an embodiment of the disclosed technology.

In one embodiment as illustrated in FIG. 1, a series of operations are illustrated depicting an exemplary creation and then utilization of a central partition in information sharing between brand owners and a consumer user. First, a consumer user may create data for a central partition by first creating an account (e.g., a universal login) on a client device 201 to be stored on a remote audience engine 214 or other device. The user may then enter information in device 201 in a variety of ways. As illustrated in operation 1, the input information may include data created by a combination of brand sorting and/or Swote™ input (as discussed in previous applications) or other tools such as entering information explicitly through keystrokes etc. (e.g., manually entering or selecting hobbies individually, using data imported from brand servers via the universal login etc.). As discussed in the above-referenced applications and also illustrated in FIG. 1, these tools may be used to create a plurality of characteristic tags such as interests, other users, brand preferences and demographics and associated statistical probabilities, which may be represented by an interest graph comprised of nodes and probability links as illustrated in operation 2 on an audience engine server 214. FIG. 10 illustrates an exemplary calculation of computing tags and associated probabilities and FIG. 1 illustrates an exemplary Swote™ input, both discussed in the above referenced applications.

As illustrated, the central partition information may be represented via an interest graph stored optionally within the central partition. The origin and contribution of each node or partition and probability contribution may also be tracked by attribution tags or other tools to indicate ownership.

Sharing information between partitions is also illustrated in FIG. 1. In operation 3, the user and brand owners may then access the above data on the audience engine 214 central partition/profile 202 (assuming appropriate permissions have been granted). In addition, the brand partitions/profiles 206 and 204 associated with the brand owner servers may transfer or otherwise share information to the audience engine for interest graph integration as needed. Also as illustrated, other users may access (with appropriate permissions) the user's data on various devices via a network.

Figure 2:
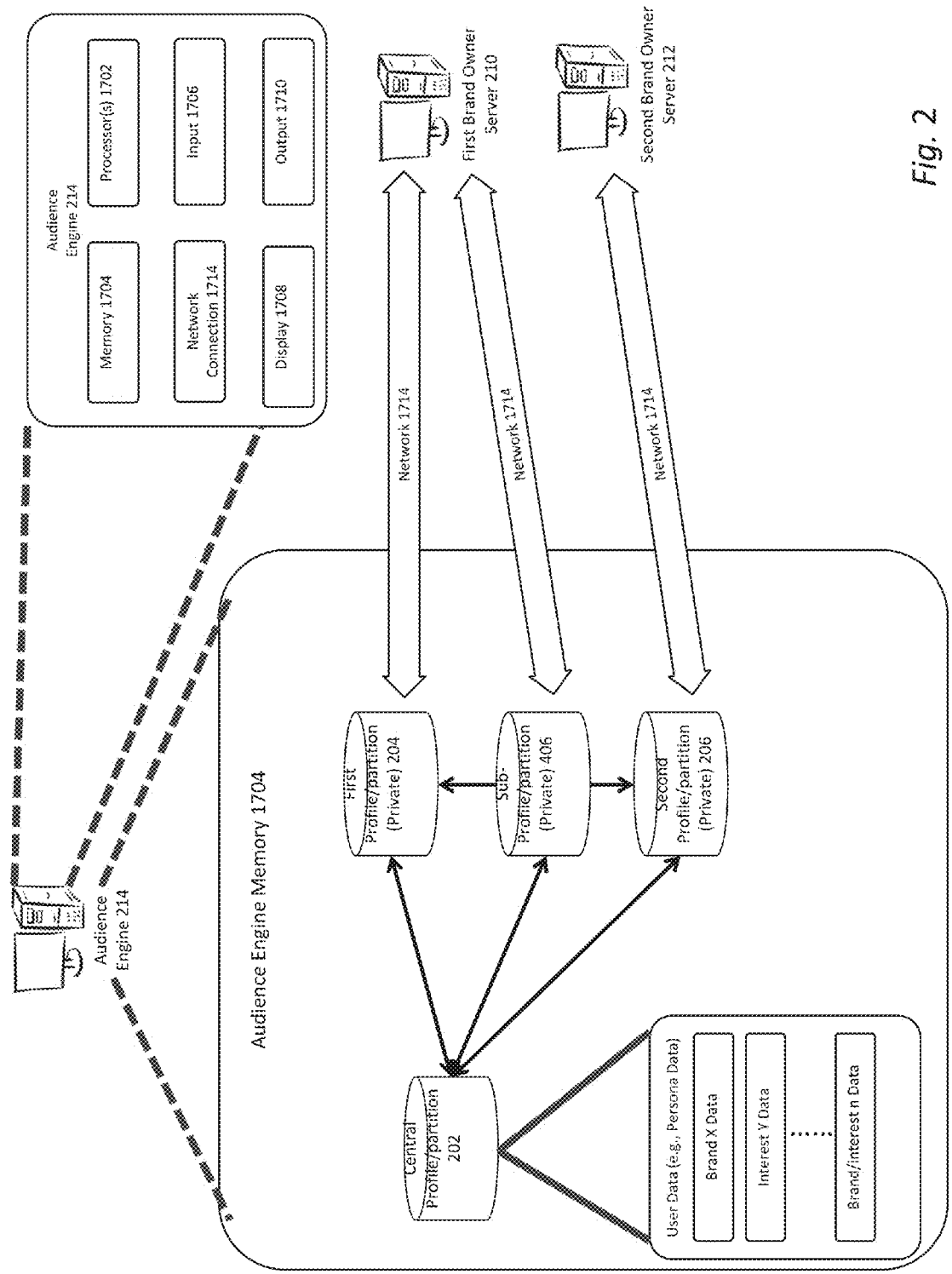
FIG. 2 illustrates an exemplary system of an audience engine and brand owner data communication/sharing and their respective exemplary data partitions.

As illustrated in the embodiment in FIG. 2, audience engine 214 itself may administer information sharing, transmission, reception and other data usage for a partition/profile(s) containing user data. The audience engine or other devices storing the partitions may be given or made aware of data usage permissions for specific pieces of data (e.g., data represented by nodes and associated probabilities) by the end user, the brand owner, the audience engine owner or a combination with any desired permission hierarchy. Said permissions not only serve to protect the user from revealing information she does not want to reveal, but also serves to protect non-generic brand owner data from other brand owners or other entities. In some embodiments, the individual partitions or individual portions of each partition of data may be tagged as above as well as any combination of these.

Figure 3:
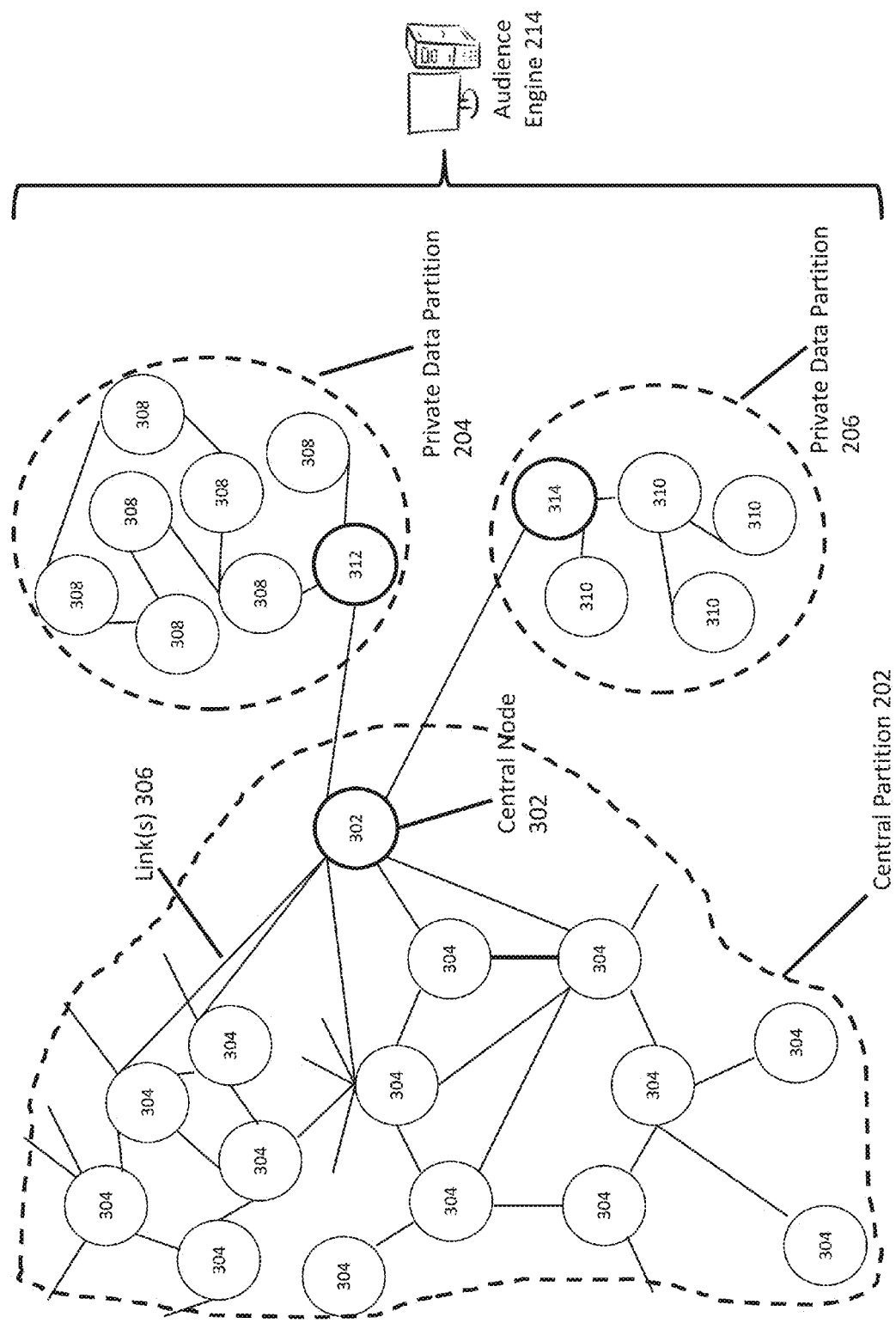
FIG. 3 illustrates an exemplary embodiment of partition data represented as interest graphs.

Expanding on the above, in one embodiment, the brand partition information may be copied from a plurality of brand owner private partitions to an audience engine server 214. Each of the brand information profiles is then optionally stored in its own partition or profile with the desired permissions (e.g., not accessible by other brand owners and users). The brand profile partitions/profiles are then linked to the central partition/profile upon user request as illustrated in FIGS. 1, 2 and 3. In operation 3, sharing information from the various private partitions can be shared in raw or generic form as discussed below.

As illustrated in operation 3, one of many contemplated data sharing configurations may be between the audience engine 214 (audience engine memory) and the brand owner server(s) 210 and 212 and may be executed by either the user/brand owner configuring via webpage login on the audience engine or by the user/brand owner configuration while logged into the brand's servers from a remote device. The data sharing between the central and brand profiles may be a one-time exchange of information or continuously updated as the data if either one of the partitions change. In one embodiment, the central profile partition and the brand profile partitions may be on the same device such as an audience engine. Brand owners may access and store their partitions on the audience engine 214 or copies may be made on brand owner servers for latency purposes.

A brand profile/partition 204, 206 may be associated with an existing user account at the brand owner's server such as a credit card account, bank account, customer account (e.g., a Nordstrom credit card account). The partition may contain non-generic/private information proprietary to the brand owner. In one embodiment, the brand account may be a simple database of purchases, browsing history, PII, contact information and other customer information. The brand partition may also have data stored in interest graph form.

The central partition may also contain or may be linked to a partition such as sub-partition 406 in FIG. 2. The sub-partition may be comprised of information from the brand owner partitions in raw and/or generic forms as discussed below. The sub-partition may focus on a specific interest (e.g., advertar/persona) of the user such as skiing, cooking, work, a brand profile or a demographic profile etc. Copies or at least partial copies or access to these copies of these sub-profiles may be shared with a brand owner server, user or other entity. Its permissions may be the same or different than the central partition and brand owner's private partitions, which are also discussed below.

In operation 4, the shared information from operation 3 (such as the data contained in a sub-partition) may be used as discussed in previous applications—such as to make content recommendations to a consumer end user, conduct reverse brand sorting, enhance brand owner partition data etc.

Partition Structure and Configuration

FIG. 3 illustrates a similar embodiment to that occurring within FIG. 2's audience engine 214. Specifically, it illustrates data as represented via interest graph nodes and links. Central partition 202 is illustrated as a separate partition from that of private brand owner data partitions 204 and 206. These private partitions feature nodes 308 and 310 respectively and are connected by probability links. The central partition maybe configured by the audience engine owner to be accessed by both the first and second brand owners that have access to 204 and 206 respectively. As such, data contained therein such as the nodes 304 and associated links 306 may be accessed by said brand owners. Thus, this central partition may function as a common source of information accessible by the brand owner's servers 210 and 212. As discussed below, central partition 202 may be optionally configured to exclude other brand owners.

As discussed above, a brand owner may wish not to expose their private non-generic information to others. Thus proprietary information may be kept confidential from other brand owners and optionally the owner of the audience engine 214. For example, in this embodiment, private partition 204 has data represented as nodes 308 and 312. These nodes and associated statistical probability links connecting them, contain information that the brand owner wants to remain private. As such, via permission tags or other tools, the data for these nodes and links is not visible or otherwise accessible to at least the second brand owner. In turn, data partition 206 is configured in a manner similar to data partition 204.

Figure 4:
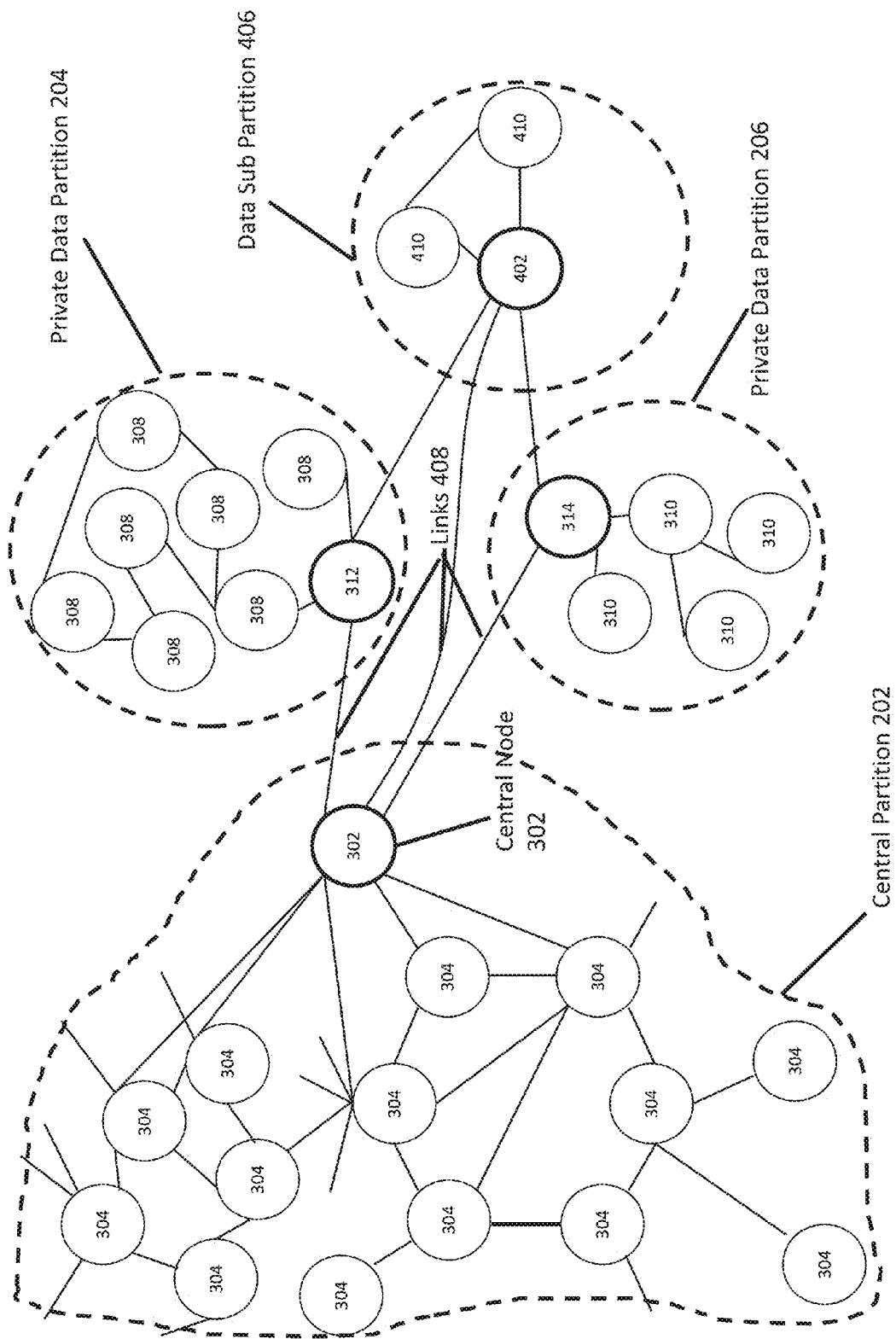
FIG. 4 illustrates an exemplary sub-partition created using partitions from the previous figure.

As illustrated in FIG. 3, the three partitions 202, 204 and 206 as illustrated are connected by links such as statistical probability links or other relationship links to a central node 302 via connecting nodes 312 and 314. As illustrated in FIG. 4, nodes 302, 312 and 314 are connected by links 408. The central node 302 in partition 202, may be an identifier of the user's profile, a characteristic, interest, location, brand, product, coupon, offer, ad or other data. In one embodiment, it is an anonymous identifier associated to an end user such as a iPhone™ application installation ID installed on her device such as her mobile phone. In another embodiment, it may just be an interest such as "frozen food" or "road biking" and the associated links may be associated statistical probabilities.

Connecting nodes 312 and 314 and the links 408 that connect them, serve to associate their respective private partitions to the central partition 202. The data within nodes 312 and 314 may or may not be known by the audience engine 214 or others. These nodes may be used for partition association purposes as discussed below, which may include partition interchanges. Connecting nodes 312 and 314 may be configured or based on data the same as node 302, or each may be different as desired. For instance, node 312 may be an anonymous ID associated to the end user's customer account on the brand owner's server or elsewhere on the audience engine. This specific integration may ease integration into the brand owner's databases. In another embodiment, nodes 312 and 314 may be a category of product or other commonality (e.g., the same tag or data property 716) that the two partitions have in common e.g., a "frozen food" node as discussed below. In other embodiments, central node 302 may have other nodes connecting partition 202 to other private and non-private partitions. The private partitions and central partition in turn may also have multiple nodes connecting them to any number of other partitions. Linking between partitions may use the illustrated nodes and links. If the data are not represented as interest graphs, any similar tools that link data partitions together may be used.

FIG. 4 illustrates an exemplary calculation of new information in newly calculated data sub-partition 406 with nodes 402 and 410. Sub-Partition 406 may be based on central partition 202, data partitions 204 and 206 or any combination thereof including other partitions. The new information may be comprised of genericized information using the genericization tools discussed below. The use of the genericization tools below means that sharing sub-partition 406 with others does not compromise the privacy of private partition data it was based upon.

Genericization of Private Partition Data

Once the various brand owners have established their private partitions on, or otherwise associated them to, audience engine 214, the data within the partitions may be directly or indirectly shared between partitions as illustrated in FIG. 4. Specifically, generic data based on non-generic data may be conditionally authorized by one private partition owner to be shared with another private partition owner or others.

Genericization of private information such as that in private partitions 204 and 206 is an important tool to allow such levering of non-generic proprietary information. Genericization may remove information such as identity information and/or substitute private information to make the information substantially common/generic. Such approaches may be via removing, substituting or altering non-generic data such as specific references, brands, content, statistical probabilities, time, type, characteristic, demographic, size (e.g., large shirt size), color (e.g., dress color), origin, property, identity, dates, locations, relationships and other data that is substantially private, data which in combination is substantially private or data designated as private by the brand owner.

Exemplary Genericization

Figure 5:
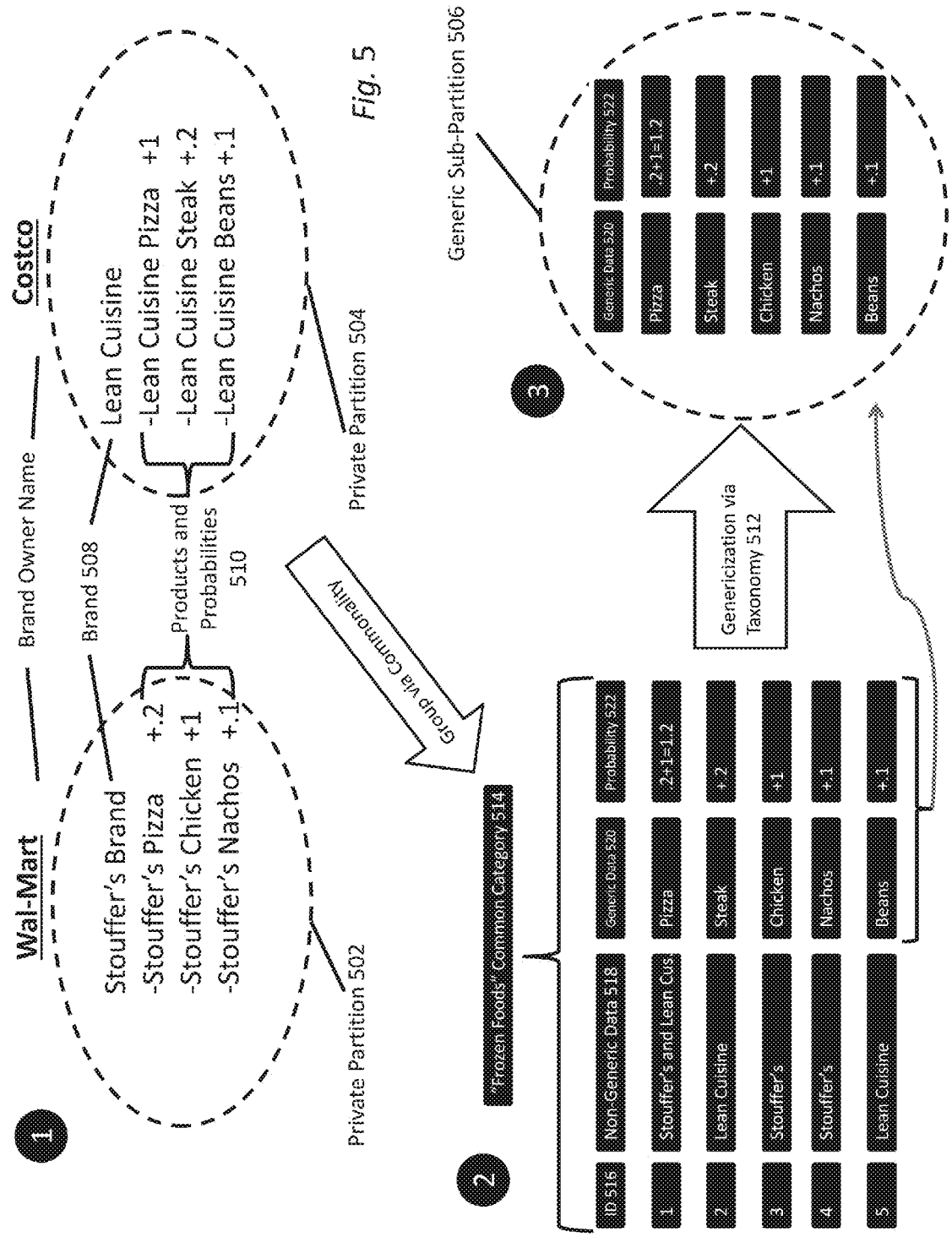
FIG. 5 illustrates one exemplary tool used to genericize private partition data into generic partition data which is subsequently stored within a sub-partition.

FIG. 5 illustrates one embodiment of genericization of two private partitions 502 and 504. Here the private partitions are owned by Wal-Mart™ and Costco™ respectively. Given that in many product spaces they are competitors, they are typically reluctant to share any data with each other—especially non-generic data that may give the other an advantage. Specifically, they have invested significant time and money collecting their data and wish to keep this information confidential but still wish to leverage their private information in exchange for other's information. Thus, genericization into a separate partition or sub-partition allows this type of data leveraging between competitors.

The data in private partitions 502 and 504 may be based on specific user inputs such as Swote™ inputs, brand sorting, direct input, user purchase history etc. As illustrated, this data was based on a Swote™ input from a specific end user about her food preferences and interests gathered by the Wal-Mart and Costco directly from their customers. In other embodiments, the partitions may comprise entire customer bases, customers with a specific interest, a specific demographic in common, a location in common or other commonality e.g., any types or grouping of data desired.

In operation 1, the private partitions 502 and 504 feature various pieces of data, which may be in any database format on a single or multiple physical partitions grouped by a logical partition etc. The information may optionally be represented as an interest graph such as those shown in FIGS. 3, 4 and 6. In such case, Stouffers brand and Wal-Mart brand 508 and may be represented as nodes themselves and connected to their various products illustrated and their associated probabilities with interest graph links. The products 510 themselves may also be represented as nodes and their probabilities as links connecting them to other nodes e.g., Stouffer's Pizza node associated with the statistical probability link "+0.2". Probabilities may also have a negative value, which indicate a lessor end user interest.

In operation 2, the data from private partitions 502 and 504 are examined for commonalities and then grouped by said commonalities (such as grouped/tagged by associated SIC, GICS, NAICS codes discussed below). This may be done for any desired commonality and at various hierarchy levels as discussed below. As illustrated, grouping is done first at a common product category level (e.g., frozen foods category) and then a common product grouping (e.g., two pizza products). Grouping may be done via: any characteristic, demographic, property, description, type, location, usage, brand, ingredient, discount, common tag, content or any other data that may be desired for grouping.

In regards to a first level of commonality, in this embodiment, the data may be examined for a common tag or other property at a common product category level. For instance, Stouffer's Pizza, Chicken, Nachos and Lean Cuisine Pizza, Steak and beans share a common property tag in that they are all tagged with "frozen foods". These may be evident by data in private partitions 502 and 504 e.g., the products were tagged as such by the brand owners. Alternately, audience engine 214 may examine each product and determine appropriate tags from this commonality by taxonomy 512, marketing data, a human marketing expert, NAICS, SIC, GICS codes etc. Here, the products may be tagged with "frozen foods" category 514 and grouped together as in the table in operation 2.

After a first grouping by commonality, individual products between the two partitions may be optionally examined and grouped by further commonality to as many hierarchal levels as desired. This may be done through text matching or taxonomies or other tools. In the former case, the "Stouffer's Pizza" and "Lean Cuisine Pizza" shared the common text identifier "Pizza". Thus, given this further commonality of these frozen foods in addition to both of them being frozen foods, these two products are grouped in the same row in operation 2.

Once the two pizza products are grouped together, their information is split/separated into generic 520 and non-generic 518 portions. In one embodiment, a commonality between data from the two different partitions may be used as the generic data 520 e.g., "pizza". As illustrated, generic data 520 is chosen as "pizza" since both Stouffer's and Lean Cuisine (data from different private partitions that have been grouped together) both offer a product with text the test descriptor "pizza". In turn, the remaining information—non-generic information e.g., their brand names Stouffers and Lean Cuisine are grouped together in non generic data 518. These are the differences in data from the common grouping between the two different partitions. Alternately, Stouffers and Lean Cuisine Pizza both have a "pizza" tag, their common tag "pizza" itself may be designated as generic (e.g., partition data subsequently tagged as "pizza") as well in addition to their composite probabilities discussed below.

A taxonomy 512, such as a semantic map and/or marketing data may also select generic data 520 e.g., generic data from a taxonomy table itself. For instance, if a taxonomy table relates different brands of pizza to a common "pizza" category, the generic "pizza" category tag in the taxonomy table can be used as generic data 520. Alternately, a list of brands and other non-generic information can be compiled and used to determine non-generic information. In operation 2, "Lean Cuisine" may be belong to such a compilation as non-generic information list but not the term "steak". Thus, "Lean Cuisine" may be designated as non-generic and "steak" as generic.

Generic data 520 and groupings, data tagging may be selected by marketing data, a taxonomy, semantic map, a human marketing expert or other tools such as Standard Industrial Classification (SIC) http://en.wikipedia.org/wiki/Standard Industrial Classification, Global Industry Classification Standard (GICS) http://en.wikipedia.org/wiki/Global Industry Classification Standard and the North American Industry Classification System (NAICS code). Determination of what data is generic/non-generic may be via the tools above as well. Also illustrated here, in the table in operation 2, an ID 516 is assigned for identification and optional record keeping purposes.

Also illustrated in operation 2, data within the same grouping (such as grouped by SIC, GICS, NAICS codes above) above have their associated probabilities grouped together in a composite probability 522. Specifically, their associated probabilities can be combined or otherwise used together. Specifically, Stoffer's Pizza had a probability of +0.2 and Lean Cuisine had a probability of +1 in their respective private partitions. In this example, their composite value is then calculated by 0.2+1=1.2. Various formulas other than a summation may be used as well as weighting different probabilities as desired. Some examples are weighting a probability considering number of users it was based on, date range the information was collected etc. As illustrated, the other products such as Steak, Chicken, Nachos and Beans had no substantially generic data counter parts so their probabilities remain separate from the other brand's products but are still grouped in the "frozen foods" category 514.

In order to present the generic information and their associated probability to other users without revealing proprietary data, the "non-generic" data 518 column from operation 2's table are separated. The generic data column and their associated probabilities are then inserted into a partition such as sub-partition 506 or any other location as desired. Specifically, in operation, 3, associated non-generic data 520 and ID 516 columns are stripped off the table formed in operation 2 to preserve privacy of the brand owner's data.

This new generic data in sub-partition 506 may be kept in a separate sub profile/partition as illustrated in FIG. 2, 4-5 or integrated into central partition 202. New permissions and propensities may be set on this new generic data partition as discussed herein or they may be given the same or similar permissions as that of data with central partition 202 or one or more of the partitions the generic partition was based upon. This information in the generic sub partition 506 may also be represented as a user interest graph and or used for product recommendations and other previously discussed uses in the above referenced applications.

Various other embodiments are contemplated in which any number of private partitions and/or commonly accessible partitions may under go operations 1-3. For instance, commonality grouping and probability calculations like the above may be based on any number of private partitions using genericized or raw non-generic data, data commonly available from a taxonomy or marketing information, data commonly accessible in central partition 202, etc.

In one embodiment, private non-generic information may be substituted with a substantially similar brand (such as those in Standard Industrial Classification (SIC) groupings e.g., data tagged with the same SIC codes) information to preserve brand owner confidentiality. For instance, instead of a generic category name like "pizza" replacing "Stouffer's Pizza", a similar brand (with similar marketing data as evidenced by substantially similar tags such as customer attributes-demographics, product offerings, content, locations etc.) to the "Stouffer's" (e.g., Godfather's Frozen Pizza Brand) may be substituted in place of it. Replacement may comprise the associated products probabilities, generic data etc. from that replacement brand. This substitute brand data can thusly be used in lieu of "Stouffer's" brand which in this case was private data.

In another embodiment, a brand such as Giant Bicycle brand is contained in a private partition. If no substantially generic brand is substantially equivalent to this brand, then a variety of tools can be used to protect the proprietary brand information "Giant Bicycles" and its associated probabilities and products. For instance via a taxonomy, marketing information or other tools can be used to replace "Giant Bicycles" with a generic category such as "bicycles". This generic category may be populated by bicycle data (brands although that no one brand alone is suitable for direct replacement of "Giant"). A plurality of products and composite probability values together across a plurality of brands may be a suitable substitute for "Giant". Thus, from these brands, associated probabilities and products can be genericized across a plurality of existing brands/products and probabilities by the tools above to produce a substantially suitable substitute. E.g., using generic data for the brands/products and averaging their probabilities to genericize the base data into data substantially suitable for replacement of the "Giant" data. For example, to find a substitute for "Giant", "Giant" may be associated to various NAICs industry classifications. Companies found to be in the same industry classifications may have their information (probabilities and other properties) aggregated together and a composite brand created for substitution for "Giant".

In another embodiment, private or generic sub partition data may be examined before or after any of the tools above are used. Examination may be for privacy sensitive information by examining the data, tags and probabilities that may lead to the user/brand being identified. If the data belongs to a list of known sensitive information, keywords, there is a probability that someone could use the related data to contact/discover the user/brand, related financial/location information, family or related user or workplace information, items bought together etc. After such examination, the data determined as sensitive can be stripped from the shared interest graph/profile/partition and, replaced, substituted as suitable etc.

Figure 6:
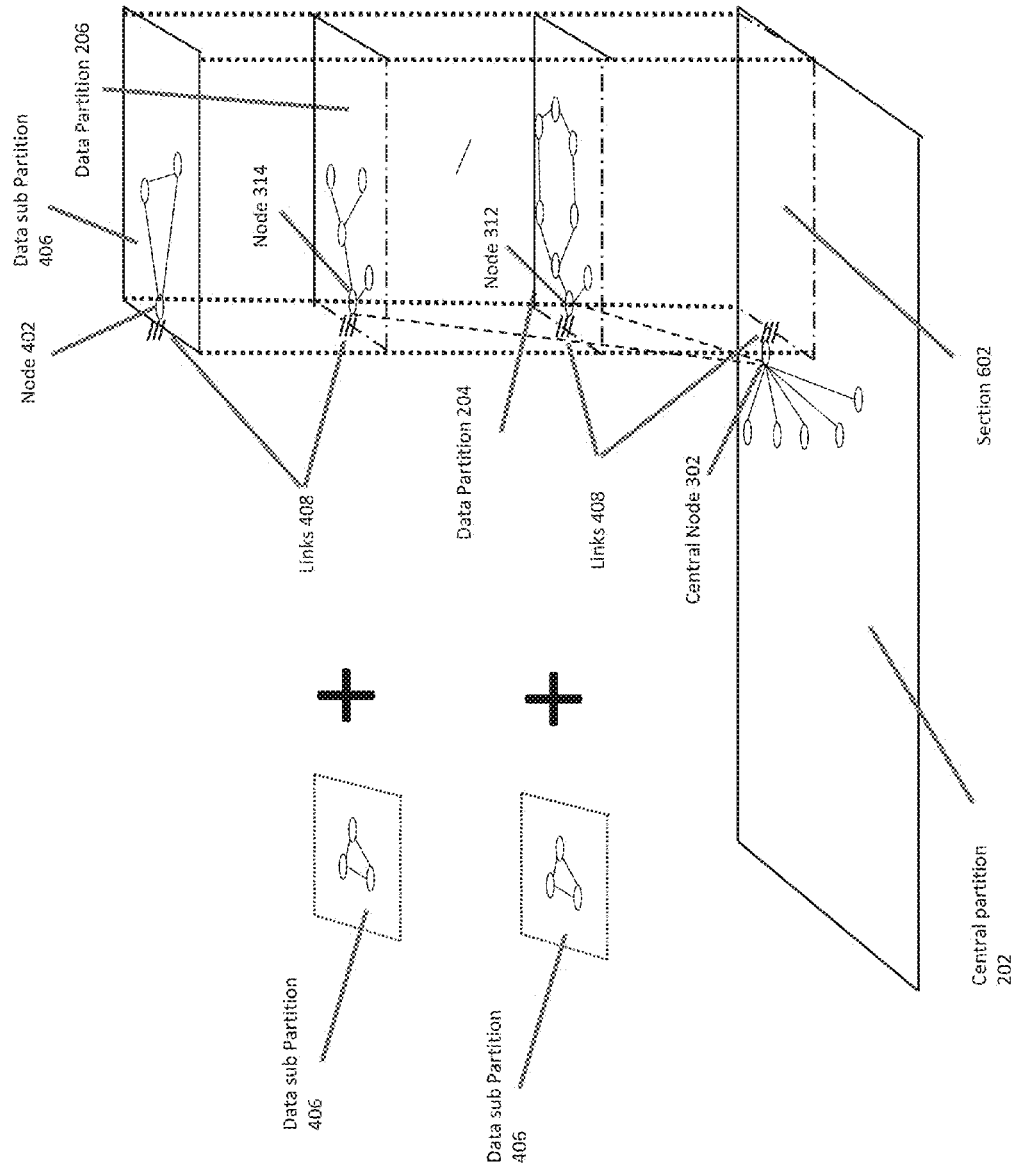
FIG. 6 illustrates private and sub-partition interchangeability with a common partition.

Leveraging the Central Partition Via Actor Identity Partition Interchangeability FIG. 6 represents an alternate view of the data discussed in FIGS. 3-4. This view illustrates the ability to the leverage central partition 202 across a variety of brand owners while keeping their proprietary partition data private. Said use being the ability to interchange partition 202 with various private partitions (e.g., private partition owned by Wal-Mart or that of Costco) depending on the brand owner identity. This interchange of private partitions provides the ability to provide context to the private partitions in view of the central partition 202 with minimum if any retooling/repurposing of the central partition 202.

Central Partition 202 (with a partial illustration of its nodes and links) is represented as having an interchangeable section 602. Sub partition 406 was calculated in a similar manner to that discussed in FIG. 5 e.g., it was genericized from two private data partitions such as partition 204 and 206 etc.

Section 602 is an interchangeable area in the central partition where the partition 202 can interchange various private partitions such as 206 and 204 as well as the newly calculated generic data sub partition 406. Section 602 may be defined as a section of the central partition 202 connected to data in the central partition which as been tagged (or otherwise designated) tags to indicate that they will be connected or otherwise associated to an interchangeable partition.

The particular private partition selected for insertion into section 602 may be selected by the audience engine or other device according to the identity of the entity viewing it and associated access permissions. Specifically, a partition that a brand owner has permission to, is selected via the partition's data properties such as ownership and permission tags. More, specifically, while central partition 202 is presented to the owners of private partitions 206 and 204, their particular private data partition that was previously selected by data property tags is presented in place of each other such that a non-owner will not see another owner's private partition. However, their respective partitions will be presented with central partition 202 to give viewer with appropriate permissions context and enhance calculations across these partitions.

Thus, partition 202 and a selected partition (e.g., 206, 204 or 406, a combination of these or a new partition based on any of these partitions) can be and presented as a whole partition to the owner of the private partition or other entity that is given access to the selected interchangeable partition and partition 202. Presentation of the plurality of partitions may be made transparent to the owners of the various partitions. For instance, in one embodiment, an entity viewing its own partition and partition 202 together may not even be able to tell that section 602 exists and the existence and extent of other owner's private partitions.

Exemplary Interchangeability Mechanics

As discussed above and illustrated in FIG. 6, central node 302 is illustrated as connecting partition 202 to the newly calculated sub partition 406 in section 602. Central node 302 may be connected to any desired node in sub partition 406. These may be connected via links 408. For illustrative purposes these links 408 are also illustrated in FIG. 6 as triple lined connectors.

If the embodiment in FIG. 5 was viewed in a manner similar to that of FIG. 6, private partitions 502 and 504 may be interchangeable with a central partition similar to that of central partition 202. A central node(s) in the central partition as discussed above may link the various private partitions and sub-partitions together as desired (e.g., linked together by nodes that the partitions have in common). Connector nodes in the private partitions may be any node but here are illustrated as nodes representing commonalities between the private partitions such as "frozen foods". Thus when partitions are interchanged, the interchange represents different "frozen food" information specific to different partition owners such as Wal-Mart and Costco as indicated by data ownership property tags e.g. data properties 716. Nodes and links attached may be products and probabilities 510.

Specifically, the Frozen Food category 514 or other common data such as a frozen food node and associated probabilities may be inserted into the partitions 502 and 504 and sub partition 506. This serves to provide a point of reference for partition interchangeability. Thus, the frozen food nodes tagged as interchangeable nodes corresponding to frozen food interchangeable nodes in other private partitions would be a point of interchange between private partitions via central node 302. In addition, sub-partition 406 may also feature a "frozen food' node for the same reason given the partition is a genericized version of frozen food information from the private partitions 502 and 504. This frozen food node in sub-partition 506 may also be connected to the generic data 520 and associate probabilities 522.

In a like manner in FIG. 6, three nodes in three different partitions, node 402, 314 and 314 were chosen to be the nodes which interchange with partition 202's central node 302. The type of interchangeable partition may be determined by common category, content, characteristic, brand or any other grouping. A plurality of interchangeable partitions may also interface with one or more nodes in partitions 202 in a similar manner.

As discussed above, this partition interchangeability in context with partition 202 provides meaningful contextual information to the private partitions and generic partitions. As discussed below, a party's ability to view various partition may be contingent upon being granted access permission in response to it contributing certain information in return.

Partition Access Permissions

Permissions are an important aspect for data privacy not only for the end consumer user, but also for the brand profile owner. In the later case, confidentiality and a prevention of data co-mingling is important as a particular brand owner may not wish to share their specific information (e.g., raw information) with another specific brand owner. However, a brand owner may be willing to share the generic information in partitions like 506 above as well as generic information in the central partition 202 with other brands. But before such sharing is agreed to, a brand owner typically needs assurance that the brand being granted access rights is in itself contributing some substantially suitable information in return for access.

As such, various permissions maybe assigned to the partitions 206, 204 and 406 as well as to other partitions and even individual pieces of data such as individual nodes and probabilities or data that these representations are based upon. Permissions may be set by the audience engine at the request of the private information contributors or set by the device storing the particular partition at issue. Permission setting may be through tagging partitions, portions of partitions or each piece of data such as a node/link with permission tags. For instance, no access permission to anyone but the owner may be assigned to a private partition. Permissions may comprise: access, read, write, execute, delete, move, copy, rename etc. Various partition users can be assigned with differing permission levels as desired such as based on, for example, data contribution level. For instance, access may be granted proportional to the contribution of information made available to other brand owners in raw form or generic form.

Equity Criteria

Determining if permissions and to data may be granted based upon a variety of criteria. One such access criteria is if an entity requesting access to a sub-partition, central partition or other partition is offering data that is a substantially equitable trade.

In the above case, an owner of a private partition may wish to ensure that an entity requesting access will exchange substantial information by providing a substantial or substantially similar amount of raw data, genericized data or a combination thereof (their offer data) in return to access to the private partition.

To determine if a data exchange like that of the above is indeed substantially equitable, various tools can be used. For instance, a data owner may require that the other owner's data proposed for exchange be: comprised of a certain number or range/threshold of users, comprised of a certain number/threshold of nodes, have particular links or other desired pieces of data, be comprised of certain categories of data she does not have or has substantially less of, does not have a substantially large amount of the same information (e.g., categories, content, brands) or equivalent information (as determined by marketing data, taxonomy, marketing experts etc.), be of similar value in terms of being evaluated from a monetary perspective (data as apprised by various well known industry techniques and/or industry experts to be worth a certain dollar amount or virtual currency amount) or threshold amount (e.g., gigabytes of data) or granularity (e.g., in terms of desired detail), the type, number of other brand owners contributing to the requested data, the contributing brand owner's data relevancy to the offered data, the requesting brand's past contributions, the requesting brand's reputation in the relevant market, financial value of the information (e.g., higher contribution if data is about an expensive product item), age of the information, the reputation of the brands, characteristics of the brands, probability ranges (as discussed below) etc. Any or a combination of the above may be used for the same or different portions of the data in question in either the private and/or contributor's partition.

In one embodiment, all the contributors to a sub partition such as 406 may layer their permission criteria together. Thus a user wishing access to partition 406, may have to satisfy all their permission criteria or the most restrictive of the criteria are overlapping.

Equitable Data Exchange Embodiments

In one example of equitable data exchanges, as above, private partition 204 was used at least in part to create sub-partition 406. The owner of partition 204 wishes only those with substantially similar data (or data above a desired granularity threshold) to be able to access sub-partition 406. In turn, sub partition 406 is configured to be accessed only by authorized users that meet such criteria.

A third party entity who wishes to view sub-partition 406 submits their data to exchange, which may be raw data, or data genericized via the tools above or any other data or a combination of the aforementioned. The data is examined/compared by the audience engine 214 or other device such as a neutral third party device. The offered data may optionally not be accessible to the owner of partition 204 and a neutral party may serve as a data "escrow" for the exchange. If the third party offered data meets the desired criteria as set by one or more of the contributors of sub-partition 406 or optionally, the audience engine owner, then the data in sub-partition 406 may be shared with the third party entity and in turn, the third party entity data shared with the owner of partition 204 or others that have contributed. This access grant may be done by reconfiguring sub-partition 406 e.g., data properties to allow third party viewing but not grant other permissions such as write permissions. In another case, if only partial criteria is met, then an amount of data proportional with the partially satisfied criteria may be shared with third party entity. Proportions may be measured in quantity, quality of data, granularity, number matching categories etc. In one embodiment, a comparison is done between one partition, or a generic partition created from another partition to the offered data. A determination of an increase in detail (granularity) is done to determine if the owner of the partition/generic partition is getting additional data from the offered data.

Once the third party is granted access to sub-partition 406, it may view it as illustrated matched with central partition 202 (assuming it also has been granted access to it as well) together for contextual purposes.

In one embodiment a brand owner may configure the tools above remotely via the audience engine 214. Specifically, as discussed above, after uploading their partition data such as tags, probabilities, affinity content inputs (e.g., brand sorting or Swote™ input) content or any other data such as end user data, the brand owner may login to the audience engine and exclude others from partition access containing their private data. The user may then configure sharing as discussed below. For instance, upon receiving offer data from another user who does not have access to the private partition, the data may be analyzed as discussed above by the audience engine or others. Upon the offer data meeting criteria that the brand owner specifies such as the various equity criteria discussed herein, access to the private partition is granted to the requesting user. The offer data is then shared with the brand owner in return. The brand owner's partition and the offer data at any time may contain tags representing an end user (user entering affinity content) input characteristic and associated probabilities. These may be configured as interest graphs and content recommendations executed as discussed in the previously referenced patent applications.

Multi-Partition Calculation Embodiments

Once a third party entity receives access to a sub-partition such as 406 and a central partition 202, various calculations may be executed. For instance, as illustrated in FIG. 6, product recommendations may be executed by using both partitions 202 and 406 together. These merged partitions may serve to execute product recommendations and deliver them to a user as discussed in previous patent applications.

In one embodiment, the owner of partition 206 may use partition 206, partition 202 and sub partition 406 together or various pieces of them together. Specifically, it may instruct the audience engine to combine these together for a product recommendation or for other purposes. Specifically, the tags and associated probabilities of the desired partitions may be merged or otherwise manipulated like that in FIG. 5. In one example, the nodes tagged with pizza in both the private partition 502 and sub partition 506 can be grouped together and probabilities combined through any desired calculations in a manner similar to that as described above. This adds the information to private partition 502 from sub-partition 506. A new partition can then be computed and viewed with central partition 202 as desired.

Probability Range Embodiment

Probability Ranges. Inclusion or omission of data from a private, central or sub partition to a new generic partition may be decided with the aid of probability ranges. In addition, probability ranges may be used to determine the quality/relevancy of data that is offered for trade and thus may affect a determined value of the data.

For instance, data may be worth less thus not exchanged at all if their nodes are within a particular probability range that infers that they are substantially similar to the owner's own data. Data with probabilities ranges that are substantially too low may be designated as not relevant enough to a particular brand owner and thus worth less in a data exchange. Data with probabilities with ranges that are substantially too high may be determined as too irrelevant e.g., too obvious. On the other hand, the same data with substantially high ranges may be designated as high value and substantially relevant. Various ranges, thresholds and scales are contemplated and may defined through the above tools e.g., marketing data, taxonomies, marketing experts, past user data specific to the specific user or segment of users in question or other tools.

Technical Problem Solved

As discussed in this document, the discussed subject matter solves several technical problems. Specifically solved, is the current problem that users such as brand owners as well as end users lack an ability to easily, equitably and anonymously/generically share their information. Therefore, what is disclosed are enhanced and flexible tools to enable users such as the above to share non proprietary data in a substantially equitable manner.

The tools above may be used on any computing device and combinations of computing devices connected to each other as illustrated in FIGS. 2, 11-13 and 17-18. An advertar may be initially created by receiving input from a client device and stored in memory, altered and processed on a local or remote computing device or a plurality of devices in including the client device. Ads and advertar related information can be input and output to these devices from third party computing devices connected over a network.

APPENDIX A

Persona Primer

As will be discussed in further detail below, the disclosed technology allows users to create personas (also referred to as "advertars" or "advatars") to serve as a privacy screen or a barrier between a user and advertisers. In addition, the disclosed technology can serve as a tool to segment a user's interests/communications. A persona may be represented as an icon or other symbol that can be selected by a user and has a number of characteristics (e.g. demographic characteristics) associated with it. The demographic characteristics may represent either actual or desired demographic characteristics of the user. The demographic characteristics associated with the personas can be used by advertisers to determine a target audience for one or more ads. In one embodiment, ads are delivered to a persona but the advertiser does know the identity of the user associated with the persona. Users may have more than one persona that can receive ads. More than one persona can be active at any time or one or more of the user's personas may be programmed to become active based on the time of day, location of the user, current activity of the user, and proximity of the user to objects, other users or locations or other factors.

Personas can be created by the user, copied from other users who have defined their personas or adopted from one of a number of predefined personas. In one embodiment, the demographic characteristics attributed to a persona are determined based on responses to the user's indicated opinions such as likes or dislikes of a number of brands. As used herein, characteristics may include the demographic characteristics of a population such as (gender, age, location, marital status etc.) as well as properties, characteristics or traits relating to single individual users such as a user's individual interests.

In one example a user who wishes to receive ads from one or more advertisers may use the disclosed tools. The user may select or create a persona that serves as a privacy barrier or screen between the user and the advertisers. Ads are delivered to a logical address, such as to an e-mail address that can be accessed by the user's computing device to receive the ads. In another embodiment, ads are delivered to a server computer (not shown) that forwards the ads to the user's computing device so that the user can receive the ads. The advertisers may not know the identity or other personal information of the user other than the fact that the user's persona has one or more demographic characteristics that indicate that the user may like to receive ads of the type presented by the particular advertiser.

In one embodiment, a persona is implemented as a computer record that represents an address or device identifier to which an advertisement can be directed as well as a number of characteristics (e.g. demographic characteristics) that may be input directly by the user or inferred from user input. The aspects of a persona that can be seen by an advertiser may not identify the identity of the user such that the advertiser cannot contact the user directly other than by the address or device identifier associated with the persona. In one embodiment, a persona has a graphic icon that represents the persona and a number of demographic tags or categories representing the likelihood that the user falls in that demographic category or wishes to receive ads that are directed to people in that demographic category.

In one embodiment, separate cookies and caches are used for each persona when using a web browser or other computing device. This segmentation of persona information prevents information cross over between personas. In addition, this segmentation gives context to the information in the cookies and caches given that all data is related to the persona's interests. This makes optional analysis of such cookies and caches more reliable since the user's activities only pertain to the selected persona. Optionally, the cookies and caches can be encrypted to protect privacy.

Figure 9:
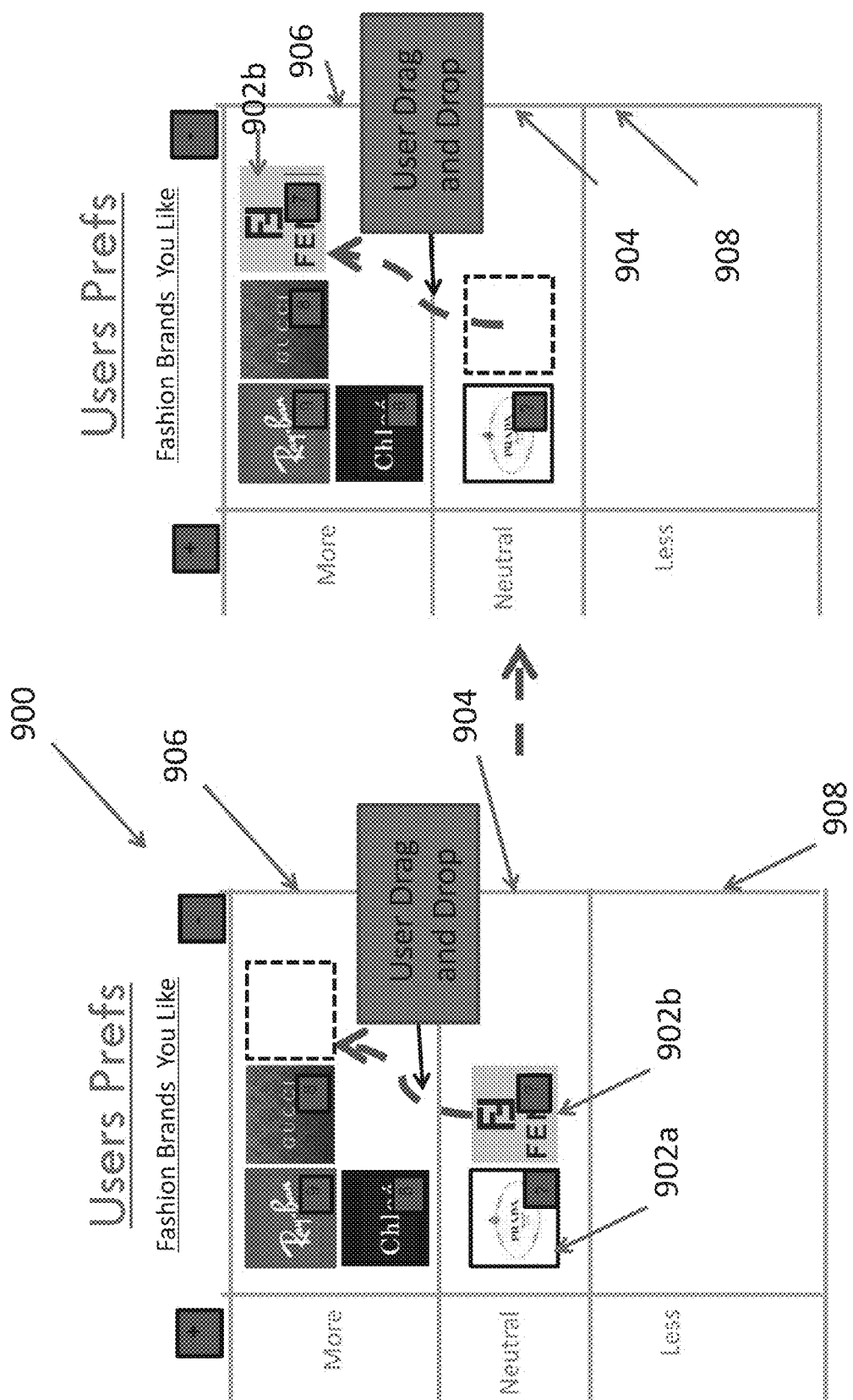
FIG. 9 illustrates one method of allowing a user to sort a number of brands to define likely demographic characteristics for a persona in accordance with an embodiment of the disclosed technology.

FIG. 9 illustrates a method by which a user can indicate their opinion of a brand such as if they like a brand either more or less or feel neutral about the brand. As used herein, an opinion may encompass input from any user interaction with or relating to the brand. Such examples include if a user likes/dislikes, purchase/would not purchase, want/do not want as well as if a user is "following" a brand such as following a brand via Twitter™. In the embodiment shown, a user interface screen 900 displays a number of icons 902a, 902b that represent recognizable consumer brands. In the embodiment shown, the interface screen is divided into three areas. A neutral area 904 represents a neutral feeling about the brand (or unfamiliarity with the brand). An area 906 is an area where the user places icons representing the brands they like more while an area 908 is an area into which the user places the icons that represent the brands they like less. Icons representing a number of brands are initially shown to the user in the neutral area 904. Users can then drag and drop the icons into one of the other areas 906, 908 to indicate that they like the brand more or less respectively.

In the example shown, a user has selected the icon 902(*b*) representing the brand "Fendi" from the neutral area 904 and has dropped it into the area 906 in order to indicate that the user likes this brand more. If the user has no opinion of the brand or is neutral about the brand, the user can leave the icon in an area of the screen 904 that groups icons for which no opinion has been expressed. Alternatively, icons representing brands for which no opinion or a neutral opinion is expressed can be removed from the screen and replaced with another icon representing another brand. Based on the opinions of the user to a group of brands, an estimate can be made of the likelihood that the user has one or more demographic characteristics (or would like to receive ads directed to users having those demographic characteristics). In some embodiments, brands that are left or placed in the neutral area of a screen may also be included in determining likely demographic characteristics in a variety of ways. For instance, if a user has relatively consistent neutral/unfamiliar opinion towards upscale brands such as Rolls Royce™ and Saks Fifth Avenue™, it may be inferred that the consumer is neutral/unfamiliar to the brands because her income level is likely not in the range of consumers who are exposed to these brands.

In an embodiment, upon selection of a brand such as an upscale brand (e.g., Rolls Royce) an inference could be made that the user is a high-income user. In response, a subsequent brand sorting screen may be presented with additional upscale brands to confirm the inference and determine other likely upscale demographic characteristics. For instance, if in the subsequent brand sorting screen, a user declined selection or voted down of all of the subsequent upscale brands, then an inference would be made that the user is a "aficionado" of expensive cars, but not a "big spender" across different types of categories such as spas, airplanes etc.

In the example shown, the brands represent known manufacturers or providers of goods or services that the user can buy or use. However for the purposes of the present application, the term "brand" is meant to be interpreted broadly. A brand may include, but is not limited to, a logo, trademark, animation, text, movies, movie clip, movie still, TV shows, books, musical bands or genres, celebrities, historical or religious figures, geographic locations, colors, foods (e.g. packaged foods), flowers, animals, designs, characteristics (young, old, short, tall), emotions (angry, bored), political views, color combinations, shapes, graphics, sounds, movement, smells, tastes, slogans, social media users, personas, patterns, occupations, hobbies or any other thing that can be associated with some demographic information. For instance any thing that can be broadly accepted or recognized by a plurality of users can be a brand. In addition, anything that can identify a seller/product/service as distinct from another can be a brand which may include Huggies™ brand diapers, Copper River Salmon, Microsoft™ software, a picture of Tom Cruise, a picture of a frame from one of Tom Cruise's movies, a musical band name, a musical band album cover, a famous picture such as the picture from Time magazine celebrating victory in WWII in which a sailor is kissing a woman, a picture of a house in the country, a picture of a Porsche™ car, a picture of a smiley face as well as concept brands such as breast cancer awareness or environmentalism etc. In addition, a brand can be an abstract idea such as "World Peace", "Save the Whales", political ideologies such as "Republican" or other concepts about which a user may have an opinion.

In one implementation, each persona is associated with one or more tags representing different characteristics such as different demographic characteristics. The association may be determined via the brand sorting during persona creation. A tag may store or be associated with a value that represents the likelihood (e.g., a probability distribution) that the demographic characteristic represented by the tag is applicable to a user. For instance, the value of the tag may reflect a probability that the user is male while another tag represents the likelihood that the user lives in New York. Other tags may store values that represent the likelihood that the user has children, likes Chinese takeout food, and votes Democratic etc.

Based on the user's indication of their opinion of the brands, such as if each brand is liked or disliked, the tag values can be combined into a composite value that reflects that likelihood that the user has a particular demographic characteristic. As an example, assume that a user indicates that they like Ford brand trucks, Remington brand shotguns and Golden retriever dogs, while another user indicates that they like Barney's of New York brand clothes, Vogue magazine and miniature poodles. Here, the first user likely has a higher probability of being a male than the second user when one compiles the composite values of the probability distributions associated to the gender demographic associated to these brands. A different composite demographic can be associated with the persona created for each user. A user may also reuse composite demographics for multiple personas preventing repetitive entry of opinions. Advertisers then use these determined demographic characteristics to decide which personas should receive their ads. Brands may be selected for presentation to the user for brand sorting based on the likelihood of a user having a certain a certain demographic characteristic. For example, selection of a cosmetic brand X likely indicates a female user in which more brands relevant to females may be presented.

In one embodiment, the composite demographic information is created from the group of brands that are sorted by the user based on her opinions of the brands. In the example shown in FIG. 10, a user indicates that they shop for (e.g. like) brands 1, 2 and 4. The user has indicated that they don't shop for (e.g. don't like) brand 6 and are neutral towards (e.g. don't like or dislike or are unfamiliar with) brands 3, 5, 7, and 8. In one embodiment, the tag values representing the likelihood that a user has a particular demographic characteristic are combined depending on if the brand is liked or disliked. In other embodiments, buy/not buy, would buy/would not buy, use or would use, do not or would not use as well as other opinions or impressions can be presented alone or in combination.

In one embodiment of the disclosed technology, the tags for the brands represent the same demographic characteristic. For example, Tag 1 for all the brands may represent the likelihood that the user is a male between ages 25-40, while Tag 2 may represent the likelihood that the user is a male between ages 40-55. Tag 3 may represent the likelihood that the user is a woman between ages 18-22 etc. Each tag has or is associated with a value representing the likelihood of a user having a defined demographic characteristic. These values for the tags are typically determined from information gathered from consumers who volunteer information about themselves and what brands they like, purchase etc. Such information is typically gathered from marketing data from consumer surveys or a variety of other data sources. The details of associating consumer demographic information with particular brands are considered to be well known to those skilled in marketing. In other embodiments, users may assign a value to a brand by inputting the value itself into the computing device, assigning a relative value to each brand and or tag (brand X given a higher preference to brand Y by giving brand X a location assignment a screen above or to the right of brand Y) etc.

Not every brand may have the same set of tags associated with it. For example Brand 1 does not have a Tag 4, while Brand 2 does not have Tags 2 and 6 and Brand 6 is lacking Tags 3 and 4.

In one embodiment, the composite demographic characteristics for a persona are created by arithmetically combining the values of the tags for the liked and disliked brands. In the example shown, Brands 1, 2 and 4 are liked so their tag values are summed while Brand 6 is disliked so its tag values are subtracted. When combined as illustrated, Tag 2 has a summed value of 4.0 (1.5 plus 1.5 minus (−1.0)). A value of 4.0 for a tag may represent a strong likelihood that a user has the demographic characteristic defined by the tag. On the other hand, a tag with a combined value of −2.5 may provide an indication that the user probably does not have the demographic characteristic associated with the tag and an inference can then be made. For example, if a composite gender tag value suggests the user is likely not a male, an inference can be made that the user is a likely female. A composite of the values of the brand tags across the brands (e.g., the sum of statistical probabilities of tag A across brands X to Y as seen in FIG. 6) may also be represented by a vector that is associated with the persona. Each brand tag value in FIG. 6 may be a dimension of the vector.

In one embodiment, based upon the composite demographic characteristics, the corresponding user or persona may be placed into pre-computed demographic segments. Such pre-computed segments are typically determined from marketing survey data. Once the user is assigned to the segment, additional associated characteristics of the pre-computed segment may be associated to the user. In addition, ads that have been specifically designed to target the pre-computed segment may be delivered to the user.

In one embodiment, an ad/offer/content that a persona may be interested in receiving may be matched with the persona based on said persona vector. Typically an ad comes with tags such as coffee, sale, spa, dancing lessons etc. Here, an ad/offer's tag values may be assigned based on marketing data taken from consumer surveys such as a probability distribution that a certain demographic (age, sex, income etc.) would likely desire to receive ads with a given ad tag. The composite of ad tag values represent a vector for the ad. Each of these offer tag values may therefore be considered as an ad vector dimension. In one embodiment, tags related to the ad tags may be assigned along with their associated values to aid in ad-persona matching.

Once a persona is defined, a plurality of ads can be ordered for presentation to the user according to likely persona affinity. By calculating the distance between the persona vector and the ad vector, such as their distances in N tag space, ads can be ranked in order of likely persona desire. The result of this distance calculation may be a ranked list of ads in order of affinity (i.e. the distance between the vectors) for a particular persona vector. In this manner, instead of filtering out ads, a relative ranking of ads is produced. Alternately, other distances between the ad and persona vectors (or any of their components) can be calculated to produce a ranking. Various other methods of ad filtering and ad sorting to match the appropriate ads to the persona may also be used. In some embodiments, location, past purchases, sale times/items, membership in customer loyalty programs, percentage off and other factors may be used to aid in ad ordering/selection. In one embodiment, the calculated affinity for a particular ad is displayed to the user as stars (e.g., an ad with a highly calculated affinity is four our of four stars etc.). In another embodiment, the ordering/filtering may consider the ratio of the geographic distance to an offer and the percentage off. For instance, if an ad is only 10% off and the distance is several hundred miles from the user, this ad would have a lower ordering then an ad that is 90% off and one mile away from the user. Here, the distance and percentage off etc., may be displayed to the user as well. In yet another embodiment, the persona may keep track of ads that resulted in a purchase by the consumer. After a purchase, the user will not be shown the ad on the persona that made a purchase or on all her personas.

Optionally, the dimensions on the persona vector and/or the ad vector can be normalized by multiplying the dimension by a scalar between for instance, zero and one, to prevent particularly strong tag dimensions from skewing the results.

In one embodiment, the composite persona demographic information is determined locally on the user's computing device with which they indicate their preference or opinion regarding various brands. In another embodiment, the opinion information such as like/dislike indications about presented brands are sent to a remote computing device, such a web server that determines the composite persona demographic information. If sent to a remote computer, the remote computer can return a persona back to the user's device.

Audience Selection

In one embodiment, once a user has created or adopted one or more personas, the personas are registered with a server computer that maps a persona to one or more addresses or other identifiers to which ads should be delivered. As discussed above, the address may be an e-mail address, IP address, device id., web site or another logical address that can be used to direct ads to the user.

Figure 11:
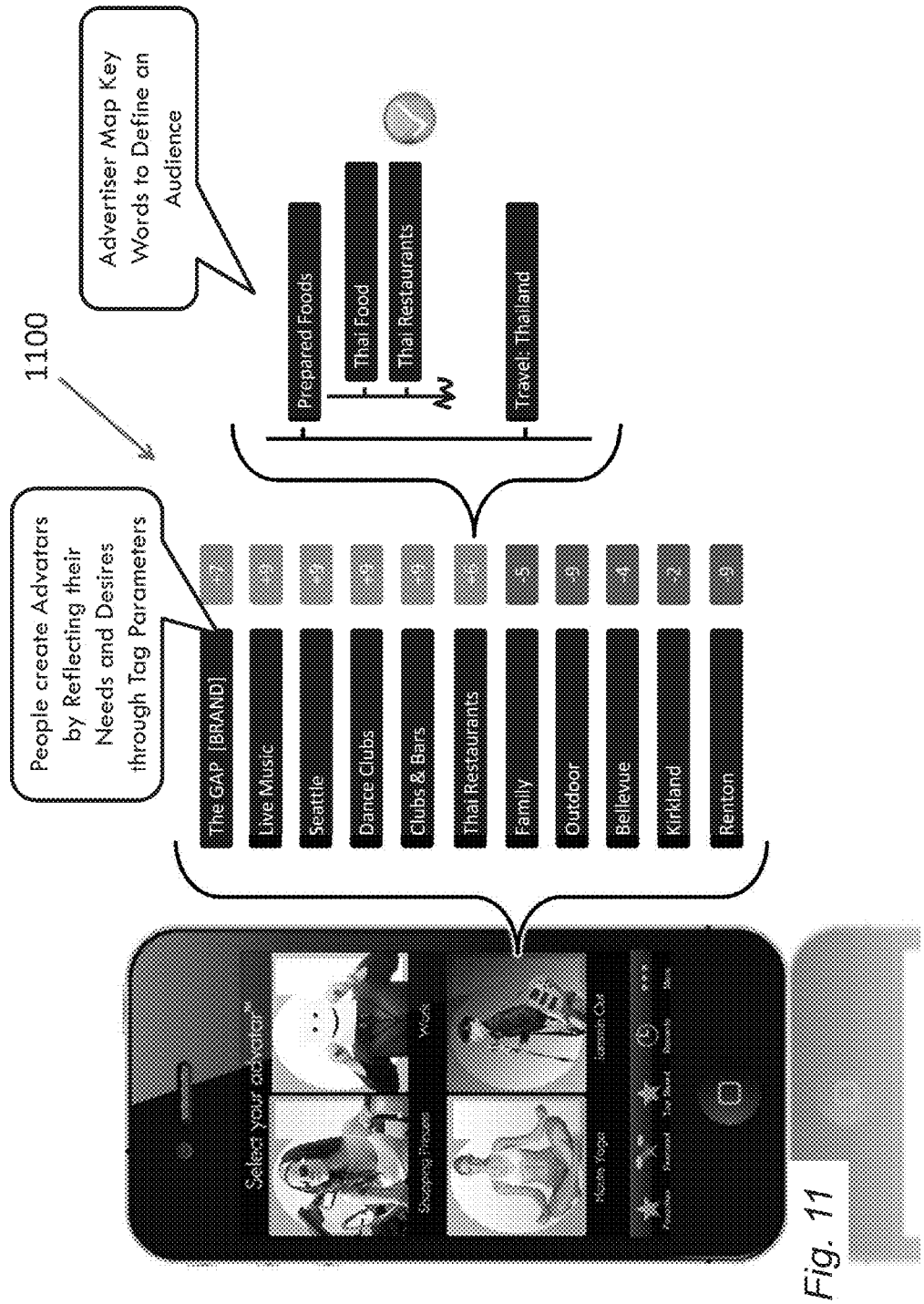
FIG. 11 illustrates how a selected persona defines a number of likely demographic characteristics that can be selected by advertisers to determine a target audience for advertisements in accordance with an embodiment of the disclosed technology.

As shown in FIG. 11, a selected persona defines one or more demographic characteristics 1100 (such as interests like That food) that may be of interest to advertisers in selecting a target audience to receive their ads. In the example shown, the persona "Jammin Out" has a +6 value for the tag that reflects an affinity for That restaurants. Advertisers looking for potential customers of That food, That restaurants, and trips to Thailand etc. may search for personas having a relatively high number for this tag in order to select a target audience for their ads.

In addition, FIG. 11 illustrates a taxonomy expanding the user's interest tags. For example, the user has rated That Restaurants a +6. As such, the user would probably be interested in prepared foods in general as well as That foods and perhaps even travel to Thailand. These relationships can be from user survey information. The new tags and associated values can be assimilated into the persona. This expansion of tags provides the user the opportunity to see additional topics, brands, times, locations and other related information. In addition, a user may give feedback on the tag's desirability and associated value.

Figure 12:
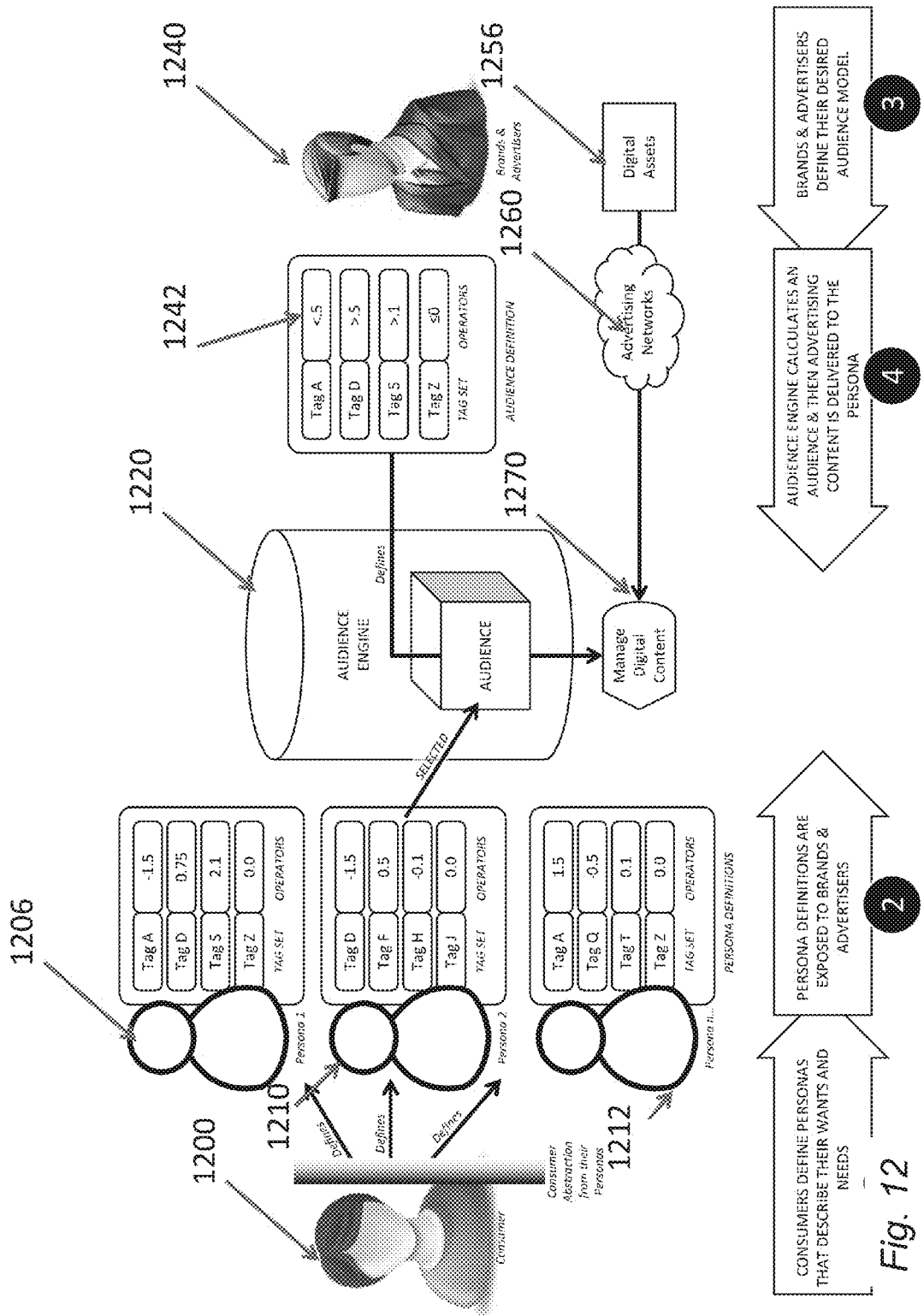
FIG. 12 illustrates one representative method of determining a target audience from the likely demographic characteristics of a number of personas in accordance with an embodiment of the disclosed technology.

FIG. 12 shows further detail of one embodiment of a system for matching tag values for a number of personas with an advertiser's needs for a target audience. In the embodiment shown, a user 1200 defines a number of personas 1206, 1210, 1212 each having different tag values that represent different characteristics such as demographic characteristics. The persona information is sent to an audience engine 1220 via a wired or wireless computer communication link. The audience engine 1220 stores the persona information in a database. An advertiser 1240 supplies the audience engine with a list of demographic characteristics such as tags and associated values they want in a target audience. These demographic characteristics are coded manually or with the aid of a computer into one or more tag values 1242 or ranges of tag values. The database of personas stored by the audience engine 1220 is then searched by the computer system to determine those personas having tag values match all, or as many as possible, of the desired demographic characteristics. Once the personas have been identified, ads 1256 are supplied from advertising companies 1260 to the audience engine 1220 that in turn forwards the ads to the addresses or identifiers associated with the identified personas. Alternatively, third party advertising companies and/or the audience engine 1220 may deliver the ads to the personas.

Ads may be displayed to users on the same device on which brand sorting occurred or on multiple different devices. The ads may be shown on these devices within a specified amount of time or upon an event trigger such as proximity to a merchant's store, the start of a sale, another user expressing interest in the ad etc.

In FIG. 12, brands & advertisers can also gather personas from multiple users. These personas can also be processed through steps 1 and 2 in which the yield is similar to the single user persona case but over multiple users. In either case, an advertiser can determine audience or single persona/user trends, similarities in buying habits, and buying locations etc. Advertisers 1240 can get anonymous predictions (without user identity) regarding predictions which are useful in displaying particular customized ads, persona/user interests in ads and associated products, or ordering inventory in anticipation of purchases. Typically an advertiser 1240 would be charged a fee by the audience engine 1220 for displaying an ad and receiving marketing data pertaining to target audiences. In one embodiment, an advertiser or other party may analyze the persona information to discover and target new audiences.

Audiences and personas may be accessed and transmit data to the audience engine 1220 on multiple applications across multiple platforms and devices. Typically each type of these interactions may communicate with the audience engine 1220 using an identifier that represents the user's persona. As such, simultaneously use of a single persona may be permitted. Advertisers 1240 may be charged for varying access to personas or audiences across various devices, platforms and applications. For instance, an advertiser may be only permitted and thus only charged to access certain personas in an audience using an iPhone™ or access can be restricted to audiences using certain iPhone applications.

In one embodiment, the audience engine 1220 tracks the active time a user spends on each persona, actions/choices/votes/location/sharing of ads of the persona, ads voted on, purchases, click-thrus, impressions, advertising effectiveness, which application was used with the persona and which device(s) was used with the persona. This tracking may be confidential and not revealed to third parties without consumer permission. The user may be offered a reward such as money, points, gift cards in return for sharing this or other data. In another embodiment, the user may chose to share this data with selected personas owned by others or herself which results in a real-time sharing of her actions.

In one embodiment, the demographic information associated with a persona is refined depending on how the user reacts to ads delivered to the persona or previous brand sortings. For example, if the user indicates that they do not like an ad, one or more tag values associated with the persona may be adjusted. In this way a persona's determined demographic characteristics can be continually improved or updated. In one embodiment, ads can be shown as icons and displayed and assigned affinity/voted on in a manner similar to how brands are sorted as illustrated in FIG. 9. Answers such as "like the ad" "neutral" and "dislike the ad", a picture of a "thumbs up" and "thumbs down" may be displayed on various screen areas so the user may know where to drag the icons to and thereby assign affinity to the ad.

In one embodiment, the feedback from user assigned ad affinity may make very granular adjustments to a persona. In one embodiment, a simple vote on an ad may modify a plurality of aspects of a persona by considering the specific tag, subcategory tag and associated weights among other things. For example, an ad was voted "thumbs up" and the ad had the following tags and associated values: car=1, car/Ford=0.2 and car/Toyota=−1 wherein car is a category tag and Ford and Toyota are subcategory tags. The persona could be modified in a plurality of ways. First, the persona would favor these tags and subcategory tags in a greater absolute magnitude than if the ad was voted "thumbs down". This prevents undue voting down because users are more expressive about things they like as opposed to things they don't like. Second, a variety of tuning factors may be applied to the tags "car" or subcategory tags "Ford" and "Toyota". For example, categories may not all be weighted equally. In one example, categories may be weighted differently for different cultures. For instance, the automobile category may receive a higher weight in US culture as opposed to cultures where automobile ownership is lower.

If an ad was assigned a negative affinity, the tag and associated values may play a lessor role in assigning ads in the future. In one embodiment, no ads with those tags or related tags might be shown to the user. In another embodiment, ads with these tags and related tags might be decreased but reintroduced to the user at a gradual rate to ensure the user does not permanently omit herself from exposure. In another embodiment, the ads with said tags and related tags simply have their weights reduced accordingly. Similar approaches to the above can be applied to brand sorting.

System for Delivering Ads to Personas

Figure 13:
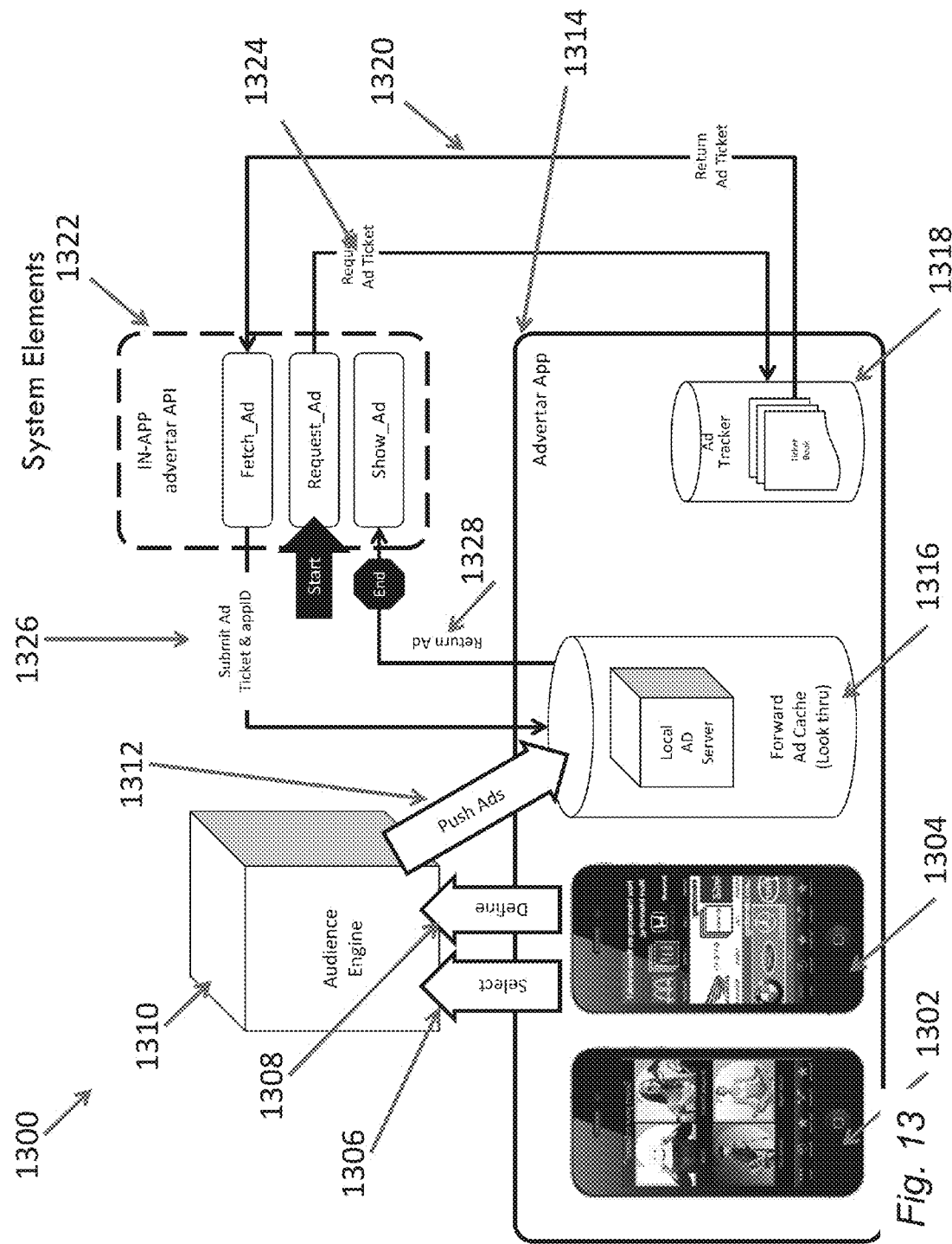
FIG. 13 illustrates one embodiment of a system for delivering advertisements to a user's computing device in accordance with the disclosed technology.

FIG. 13 illustrates an exemplary system 1300 for creating personas and ad serving to a persona on a computing device. As used herein, the term "ad" is to be interpreted broadly and can include promotional materials, rebates, consumer notices, content, political or religious materials, coupons, advertisements (including push advertisements), various kinds of recommendations (such as product/service recommendations, content/media recommendations), offers, content (movies/TV shows) and other information that a user may which to receive. At 1302 a mobile device is shown. On the screen are images representing four personas tied to a single account. A user may optionally register the account under any identifier including an email address. In one embodiment, the email address is one way hashed and discarded after the hash. The hash is optionally stored by the audience engine and serves as an identifier. This prevents the storage of user's identifying information on non-user devices and enables the user to have an identifier in case she forgets her password etc. In another embodiment, only one persona is created and no identifier is asked from the user. Instead, a software install ID or other identifier is used to identify the persona.

A persona may be created by optionally choosing a name for the persona, associated interests/keywords (e.g. to help focus ad searches), social media accounts to tie the persona to and active locations/times the persona should be active among other parameters. Then, a brand sorting screen may be displayed at 1304. Upon sorting a number of brands, at 1306 and 1308 the brands that define the persona are transmitted to an audience engine 1310, which may be on a remote server.

The persona's demographic characteristics are matched with ads, offers, coupons, services, products, content recommendations or other similar things. Typically, the audience engine 1310 is in communication with a third party ad server and/or ad bidding system (not shown). The ads may be pre-downloaded to the audience engine 1310 and analyzed. Analysis may be performed by assigning tags and associating statistical probabilities that particular demographics would be interested in the ads or assigning probabilities to existing tags or other data related to the ad. The ads are then optionally ordered in relevance to the characteristics of a particular persona's vector as previously discussed. Here, in response to the persona creation, a plurality of ads are pushed to the mobile device at 1312 from the audience engine 1310. The ads are pushed into a local ad server 1316 on the user's computing device. Here the local ad server is within the application 1314 that created the persona. Within the application 1314, is an ad tracker 318 with a ticket book. Each ticket may be used to request an ad from an in-application persona API 1322. In one embodiment, a ticket may contain information to display an ad to one or more personas and/or to different devices or applications associated with the persona.

The request for an ad may occur upon a user or a software request or on the occurrence of an event such as an arrival of the device at a physical location, keyword in communication, predetermined by an advertiser, event on a calendar, time of a TV show, a triggering event such as visiting a website, date of a product sale etc. API 1322 may start the ad request at 1324, which is transmitted to ad tracker 1318. Ad tracker 1318 returns a return ad ticket at 1320 to API 1322. API 1322 then submits the ad ticket and application ID at 1326 to the local ad server 316. The local ad server then displays the ad on the device or other connected devices at 1328. In one embodiment, the application ID at 1326 can be directed toward other applications on a plurality of connected devices in order for an ad to be shown on other devices. Optionally, upon display of the ad, at 1326 a request can be made to a connected device to display other content such as a website related to the displayed ad or the ad itself on other devices.

Masking User Identity

Figure 14:
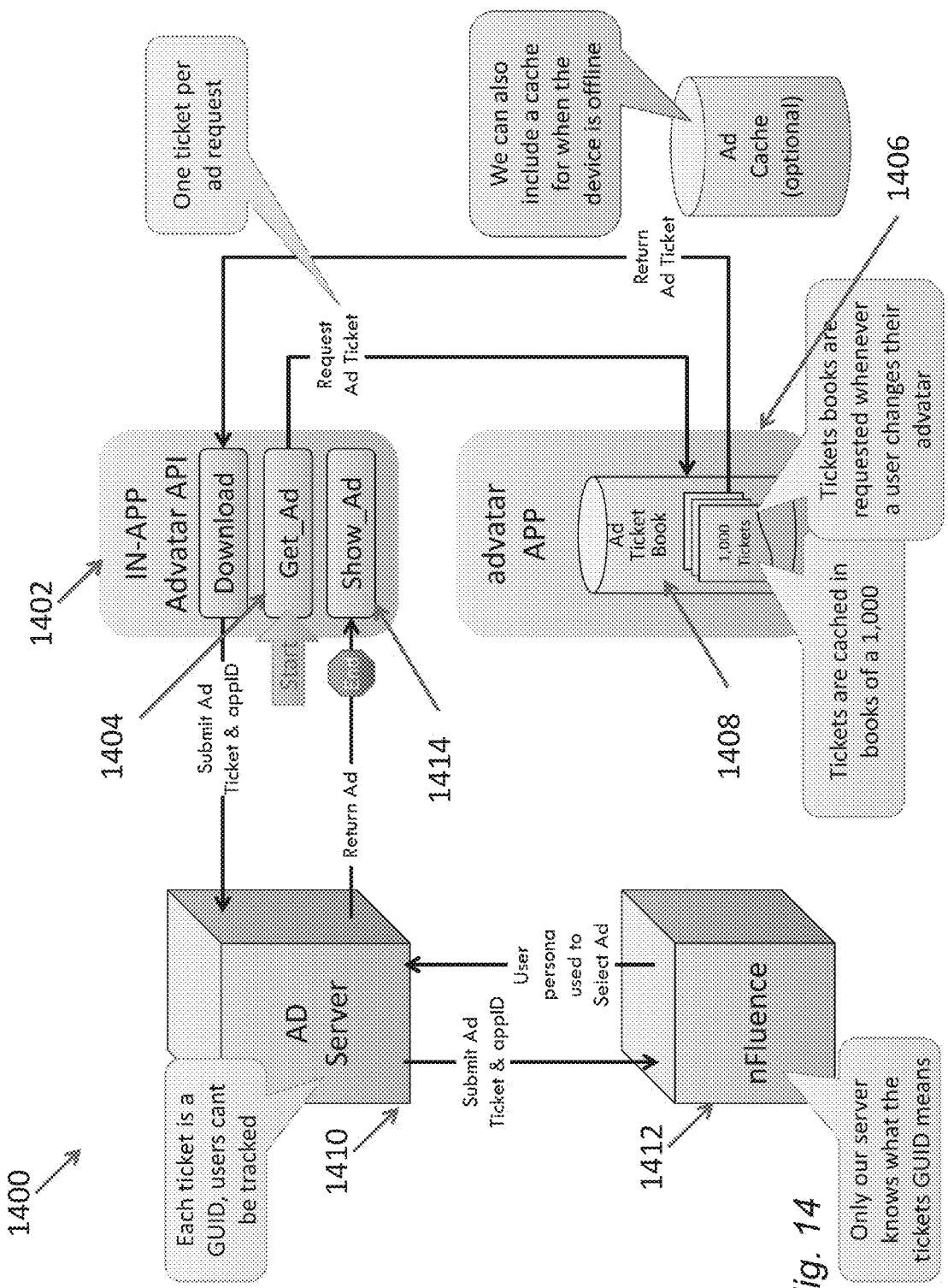
FIG. 14 illustrates further detail of a system for selecting and delivering advertisements to a user's computing device in accordance with an embodiment of the disclosed technology.

FIG. 14 illustrates a system 1400 in which a user's identity can be protected from being discovered during persona advertising. In one embodiment, a GUID or other non-traceable ID, such as a software install ID, is assigned to each user/persona and this information is optionally associated with an IP address as the only information shared with advertisers etc. At each exposure point, a new GUID may be assigned to prevent identity triangulation. In one embodiment, GUIDs are automatically changed even on the same visit at every exposure point for added privacy.

At the start operation, the in-app Advatar (persona) 1402 (typically stored on the user's device within an application) has a Get_Ad 1404 software module which requests a ticket (each ticket may contain a different GUID(s)) from an Advatar app 1406 on any desired device connected to a network. The Advatar app may cache a plurality of tickets in an ad ticket book 1408. The in-app Advatar 1402 is designed to request/receive and display ads via tickets and optionally designed to accept persona feedback on an ad and the persona's actions.

The ticket requested by the in-app Advatar 1402 is sent from the Advatar app 1406 to the in-app Advatar 1402 with which the ticket is then associated with an application ID. The application ID is then sent to an advertiser's ad server 1410, an ad exchange or real time bidding system. In one embodiment, different tickets may optionally correspond to tickets to show different personas ads. From there, the ad ticket and appID is passed to a secure third party server (e.g., audience engine) 1412 in which this sever, and optionally not the advertiser's server, knows what the ticket GUID means in terms of the user's identity or other sensitive information e.g., profile etc. Another use of the GUID is that users may appear simultaneously as different GUIDs on different devices in a secure manner. For example, advertising server A would see the GUID as 1234 and the same user is seen on advertising server B as user GUID 4567 but only the server 1412 would be able to determine the true identity of the user. The apparent GUID may even change periodically while accessing the same website (server 1412 will periodically assign a new GUID). The secure third party server 1412 would coordinate the information with the correct master ID as only it knows the corresponding GUIDs and identity/persona information. This protects the user from unwanted contact from advertisers such as SPAM as the advertiser has no email or other personally identifiable information. Although in one embodiment, the ad server 1410 has the user's IP address in order to return an appropriate ad to the persona.

Given the persona profile on the secure third party server 1412, an appropriate ad or kind of ad is determined. The appropriate type of ad is then communicated to ad server 1410. The advertiser's server 1410 then forwards the appropriate ad determined by the secure third party server 1412 to the in-app Advatar 1402 via an IP address that the in-app is hosted on. Once at Advatar 1402 a Show_Ad module 1414 then displays or caches the ad for later display. Various other software embodiments are contemplated for masking a user's identity.

Brand Sorting Embodiments

In the embodiment shown in FIG. 9, a plurality of brands are first displayed in the neutral area 904 for sorting into the other areas or to be left in area 904. Brands may be presented to a user based upon statistical market research and the desired attributes to be collected. For instance, a "like" of the Huggies Diaper™ brand may suggest a high probability distribution that one is a parent. Selection of Huggies and Toys R' US™ brand may further confirm that one is a parent. Brands may be suggested to a user based upon sites or actions that the user has engaged in, installed apps, keywords or senders/recipients in communications, geographic history (infers you have visited a location related to a brand with a mobile device), contacts/friends, current or future locations, interests etc. Each of the brands may be weighted as desired to help determine desired characteristics.

Upon brand sorting, ads and other recommendations can be displayed to a user. Upon ad feedback, the user may be displayed another series of brands (or ads) to vote on for a finer granularity of recommendations. In one embodiment, this ad voting may adjust values of a single persona vector or even multiple personas. For instance, a demographic dimension within the vector may be voted up or down by a desired amount depending on how an ad is voted. For instance, if many ads that are targeted to a certain demographic are voted up, then that demographic dimension in the persona may be adjusted up. However, to prevent a single dimension within a persona vector from unduly influencing the entire persona vector, dimensions can be optionally bounded.

In another embodiment of the brand sorter, different opinions can be asked depending on the desired context. The chart below illustrates some examples:

|         | Brands     | Advertising    | Offers  |
|---------|------------|----------------|---------|
| Up      | Like       | More Like This | Save    |
| Neutral | Don't Care | Don't Know     | Neutral |
| Down    | Dislike    | Less Like This | Discard |

Different combinations and actions can be taken from the above chart. For instance, if a brand is "disliked" the brand's associated values may simply be weighted down in the persona. However, if a brand is not liked, the brand's associated values may be completely discarded. In addition, any associated tags may be flagged as not suitable for the consumer at all. Alternately, this "unsuitable" data may only be discarded for a short time and gradually be reintroduced to the user.

In other embodiments additional information may be displayed to the user during brand sorting during drag and drop selection. For example, as the icon 902*b* in FIG. 9, is selected by a user with a finger and is gradually moved from its initial position, the initial position may be occupied with "peek text" that serves as information in the space formerly occupied by the icon which may display additional information such as the name of then brand in text etc.

Monetization Embodiments

FIG. 12 also illustrates a system for monetization of the personas. Here audience engine 1220 produces an audience of users whose personas fit a desired brand or advertiser definition such as coffee drinkers who live in Seattle and who are over 30 years old, which is gathered or inferred from brand sorting or other techniques.

The advertiser or brand 1240 can then use the resulting persona data from the audience engine 1220 to analyze their products, ad performance, marketing strategy against any desired audience. Product ad effectiveness to a persona(s) in desired audiences can be ascertained by comparison of common and/or related tags between the persona and the ad tags and associated tag values. Analysis could comprise analyzing user votes on the ads, if the ad was clicked on by the user, if a product was purchased etc. A fee could be charged for such services to the advertiser 1240.

Email Accounts and Personas Embodiments

In one embodiment, under a single user account, each persona may be associated with a separate email address. This permits the user to have an email address focused specifically on a single persona. Each persona my have the ability to decline/filter communications according to keyword, sender, dates or other criteria to prevent the persona from being overwhelmed with unsolicited communications.

Figure 15:
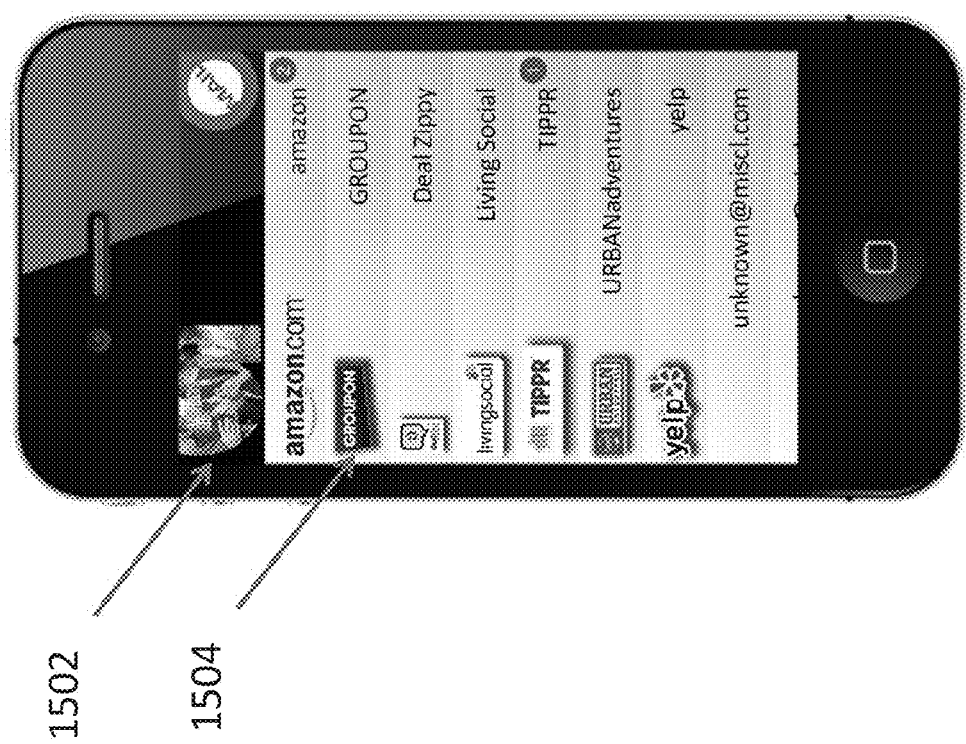
FIG. 15 illustrates one embodiment of a representative user interface screen displaying a persona's email program.
Figure 16:
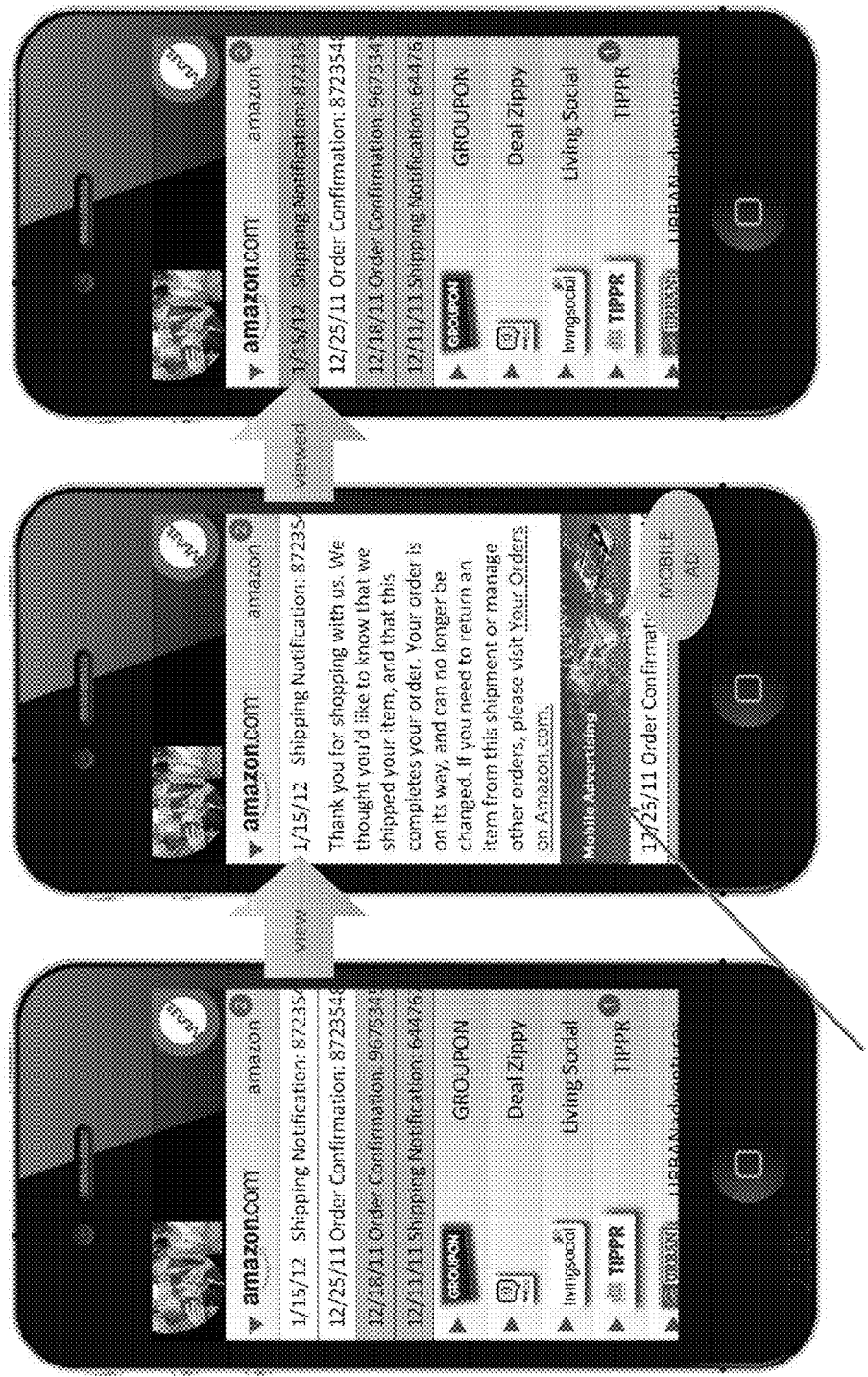
FIG. 16 further illustrates one embodiment of a representative user interface screen displaying a persona's email program.

As illustrated in FIGS. 15-16, a persona may be associated with an email program and an address to help organize information. New email addresses may be created by appending information to existing email addresses. For instance, if an email is brian@roundtree.org, a new email address for a persona may be brian@roundtree.org.0mail.com or other methods can be used to create new email addresses.

The persona 1502 may access an email program as shown in FIG. 11. The email program may group persona emails by domain 1504 and may associate an icon and company name upon domain recognition. An active persona icon 1502 may also be displayed.

An arbitrary level of importance assignment may be featured in which high importance messages such as password assignments are given certain levels that are marked next to the domain "level 1" indication and lesser important emails are given lesser importance levels.

FIG. 16 illustrates functionality of the email program for a specific persona. Here, emails are listed by domain, assigned importance levels and may be read. At 1602, advertising can be directed in the email program using technology discussed in this document. Optionally, the advertising may be based on the active persona and/or related to the subject of the message being read. In addition, once the email is read, it is marked as viewed.

Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Figure 17:
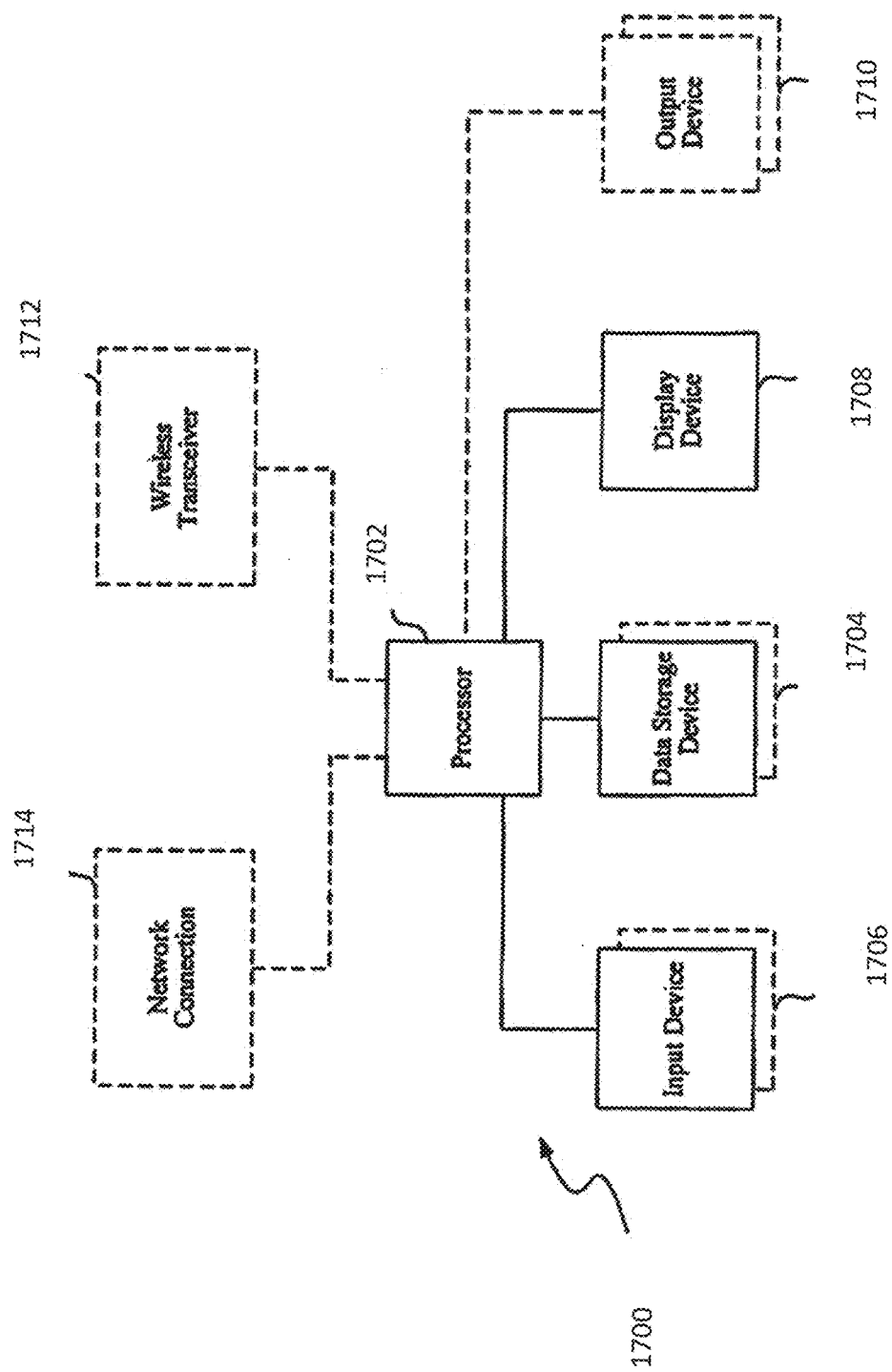
FIG. 17 illustrates a block diagram of a user's computing device in accordance with an embodiment of the disclosed technology.
Figure 18:
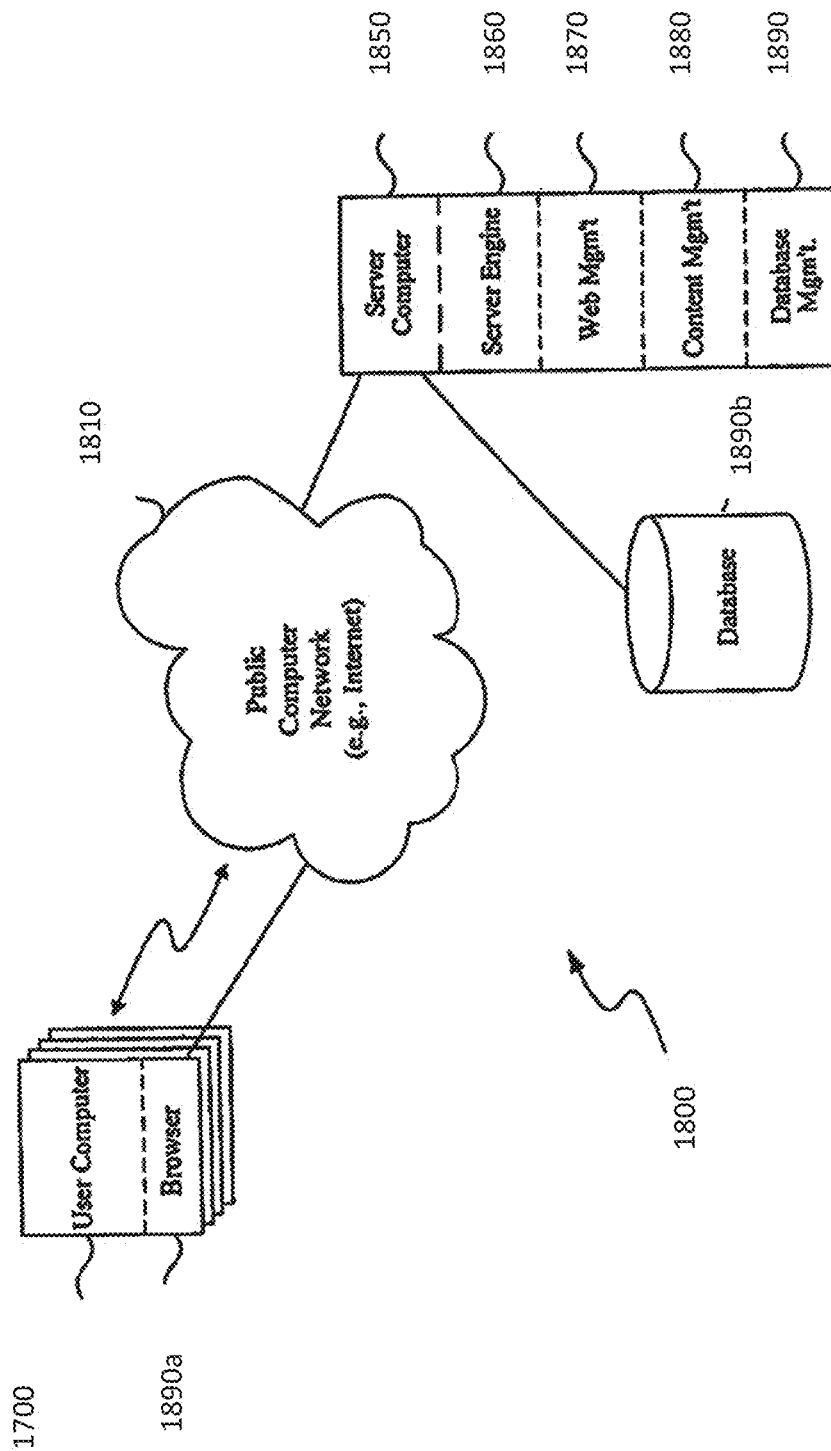
FIG. 18 illustrates one embodiment of a networked computing system used in implementing the disclosed technology.

A non-transitory, computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing device using data stored on one or more computer-readable storage devices or received from other sources. A representative data processing device is shown in FIG. 17.

The data processing device includes "processor electronics" that encompasses all kinds of apparatus, devices, and machines for processing data, including by way of example a programmable microprocessor 1702, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 1704 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 1308, e.g., an LCD (liquid crystal display), LED (light emitting diode), or OLED (organic light emitting diode) monitor, for displaying information to the user and an input device 1706 such as a keyboard and a pointing device, e.g., a mouse or a trackball, track pad, temperature sensor, accelerometer, light sensor, audio sensor, wireless signal detection sensor etc., by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 1700 may also include a wireless transceiver 1712 such a cellular radio, WiFi or WiMax transceiver, Bluetooth transceiver and a network connection 1714 etc. The data processing device may also include an output device such as a printer 1710. In addition, the device may include location sensing devices (GPS etc.), as well as clocks and other circuitry (not shown).

As shown in FIG. 14, embodiments of the subject matter described in this specification can be implemented in a computing system 1800 that includes a back-end component, e.g., as a data server 1850, or that includes a middleware component, e.g., an application server, or that includes a front-end component, e.g., a client computer 1700 having a graphical user interface or a Web browser 1890a through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 1810 (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 1850 transmits data (e.g., an HTML page) to a client device 1700 (e.g., for purposes of displaying data to and receiving user input from a user interacting with the client device). Data generated at the client device (e.g., a result of the user interaction) can be received from the client device at the server. In the embodiment shown in FIG. 17, the server computer 1850 operates server engine software 1860 and web management software 1870 to receive data from and send data to remote clients. In addition, the server computer operates a database 1890b to store persona information for users who wish to receive ads as described above. Content management software 1880 and database management software 1890 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:
1. A processor-based system, comprising:
   a. memory for storing instructions that are executable by processor electronics;
   b. the processor electronics configured to execute the instructions in order to:
      i. configure a first private partition to be accessible to a first user and not a second user;
      ii. configure a second private partition to be accessible by the second user and not the first user;
      iii. remove identifying data from at least a portion of the first private partition and put the remaining generic data into a first generic data partition configured to exclude second user access;
      iv. determine if an offer from the second user to allow access to at least a portion of data in the second private partition or data based at least on the portion of the second private partition would result in an increase of first private partition data detail if the portion of data in the second private partition or data based at least on the portion of the second private partition were integrated with data in the first private partition; and
      v. in response to a determination of first private partition data detail increase, configure second user access to the first generic data partition in exchange for first user access to the offered data.
2. The system of claim 1, wherein an increase in first private partition detail occurs if the offered data comprises:

i. a different data category than those in the first private partition; or ii at least one category with a larger amount of data in comparison to the amount of data of the same category in the first private partition.

3. The system of claim 1, wherein an increase in first private partition detail occurs if the offered data comprises:

i. a similar quantity of data to that in the first private partition; or ii. data based on a larger number of users in comparison to the number the data in the first private partition is based on.

4. The system of claim 1, wherein an increase in first private partition detail occurs if the offered data comprises:

i. unrelated data to that in the first private partition; or ii. related data to that in the first private partition.

5. The system of claim 1, wherein removing identifying data in the portion of the first private partition comprises the steps of:

a. finding data in the first private partition and in third partition sharing a common tag, wherein the common tags are associated to probabilities;

b. combining the associated probabilities associated to each common tag; and c. separating generic data from non-generic data in said grouped data, wherein the generic data are the common tags and combined probabilities.

6. The system of claim 1, wherein removing identifying data comprises the steps of:

a. determining identifying data by cross referencing data in the portion of the first private partition with non-generic marketing data; and b. substituting for the identifying data, generic marketing data with similar associated probabilities.

7. The system of claim 1, wherein the processor electronics is further configured to calculate a new data partition based on the first generic data partition and the second private partition.

8. The system of claim 1, wherein the processor electronics is further configured to create a relationship link between data associated to a tag in the first private partition and data associated with a similar tag in the second private partition.

9. The system of claim 1, wherein the processor electronics is further configured to create a relationship link between data associated to a tag in the first private partition and data associated with a similar tag in the first generic data partition.

10. The system of claim 1, wherein the data in the first private partition is comprised of:

1) a user characteristic; and 2) a statistical probability associated with said user characteristic, said user characteristic and statistical probability based at least upon a user content affinity input.

11. The system of claim 1, wherein the data in the first private partition is comprised of:

1) a user characteristic; and 2) a statistical probability associated with said user characteristic, wherein the user characteristic and statistical probability are configurable as components in an interest graph in which the user characteristic is represented as an interest graph node and the statistical probability is represented as an interest graph link connecting the interest graph node to another interest graph node.

12. A processor-based system, comprising;

a. memory for storing instructions that are executable by processor electronics; and b. the processor electronics configured to execute the instructions in order to:

i. separate identifying data from at least a portion of a data partition by:

1. finding data in the portion of the data partition and another partition that share a common tag, wherein the common tags are associated to probabilities;

2. combining the associated probabilities and data associated to them between data from the portion of the data partition with the other partition that share a common tag;

3. separate portions of generic data from portions of non-generic data in the combined data, wherein the portions of generic data is data that is common between both the portion of the data partition and the other partition has in each combined tag grouping and their combined probabilities; and ii. create a generic data partition comprised of the portions of generic data.

13. The system of claim 12, wherein the processor electronics is further configured to calculate a new data partition based on the generic partition and the data partition.

14. The system of claim 12, wherein the processor electronics is further configured to create a relationship link between data associated to a tag in the data partition and data associated with a similar tag in the generic data partition.

15. The system of claim 12, wherein data in the data partition is comprised of:

1) a user characteristic; and 2) a statistical probability associated with said user characteristic, said user characteristic and statistical probability based at least upon a user content affinity input.

16. The system of claim 12, wherein data in the data partition is comprised of:

1) a user characteristic; and 2) a statistical probability associated with said user characteristic, wherein the user characteristic and statistical probability are configurable as components in an interest graph in which the user characteristic is represented as an interest graph node and the statistical probability is represented as an interest graph link connecting the interest graph node to another interest graph node.

* * * * *